March 3, 1942. R. H. SCHULTZ ET AL 2,274,745
EQUIPMENT TO PRODUCE PACKAGED ROLLS
Filed Aug. 3, 1940 14 Sheets-Sheet 2

INVENTORS
Rudolph H. Schultz
Adam J. Siebert
BY
Their ATTORNEY

March 3, 1942.  R. H. SCHULTZ ET AL  2,274,745
EQUIPMENT TO PRODUCE PACKAGED ROLLS
Filed Aug. 3, 1940  14 Sheets-Sheet 3

March 3, 1942.    R. H. SCHULTZ ET AL    2,274,745
EQUIPMENT TO PRODUCE PACKAGED ROLLS
Filed Aug. 3, 1940    14 Sheets-Sheet 5

INVENTORS
Rudolph H. Schultz
Adam J. Siebert
BY
THEIR ATTORNEY

March 3, 1942.  R. H. SCHULTZ ET AL  2,274,745
EQUIPMENT TO PRODUCE PACKAGED ROLLS
Filed Aug. 3, 1940  14 Sheets-Sheet 6
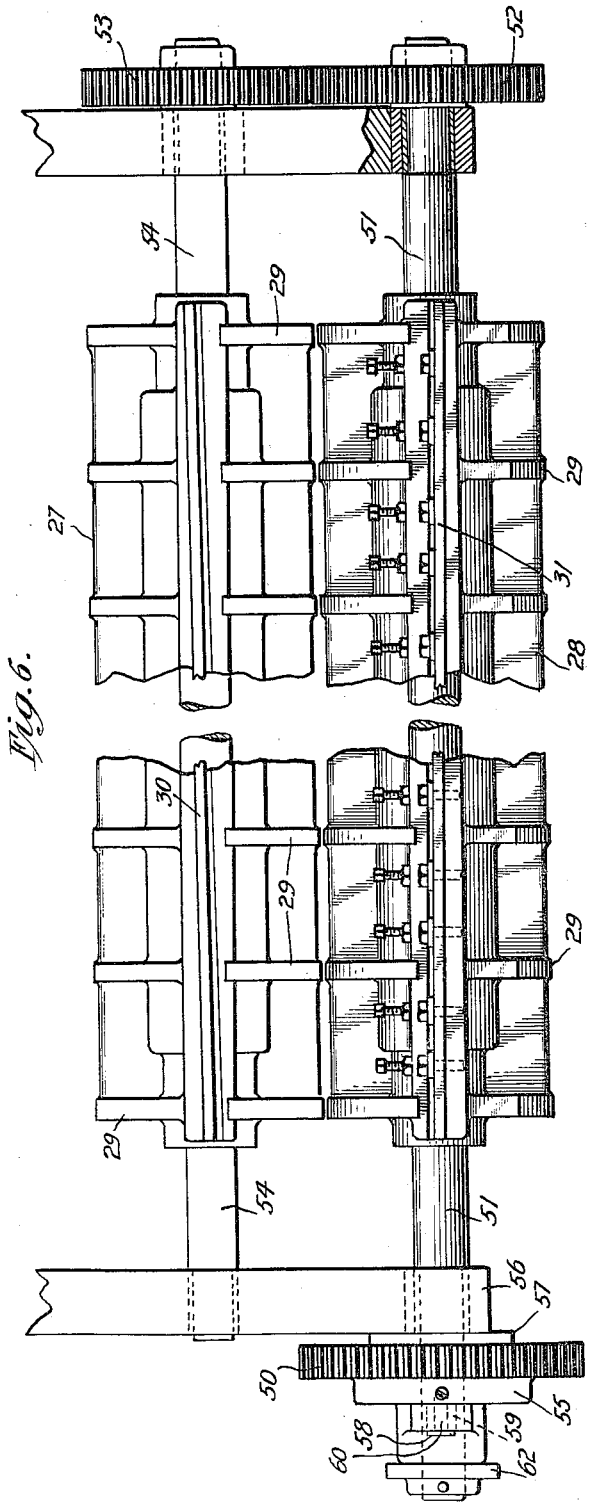
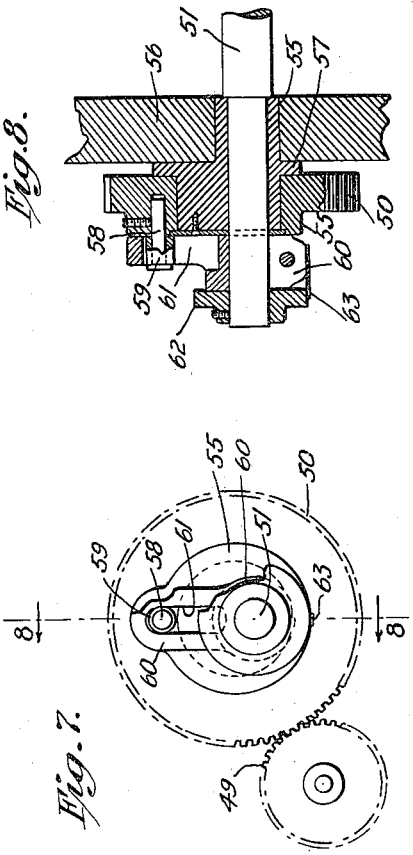
INVENTORS
Rudolph H. Schultz
Adam J. Siebert
BY
Their ATTORNEY.

March 3, 1942.  R. H. SCHULTZ ET AL  2,274,745
EQUIPMENT TO PRODUCE PACKAGED ROLLS
Filed Aug. 3, 1940  14 Sheets-Sheet 7
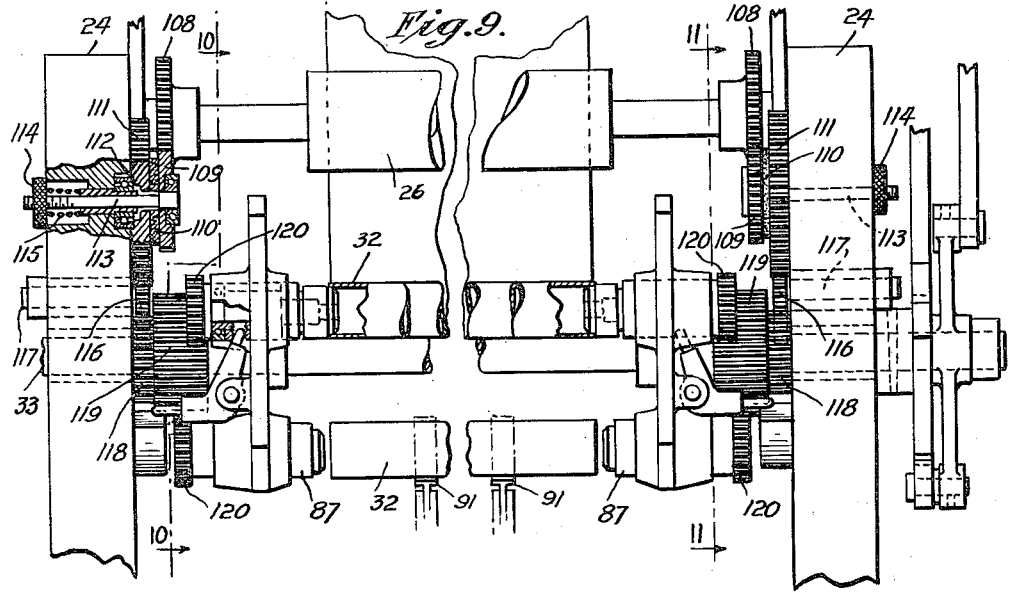
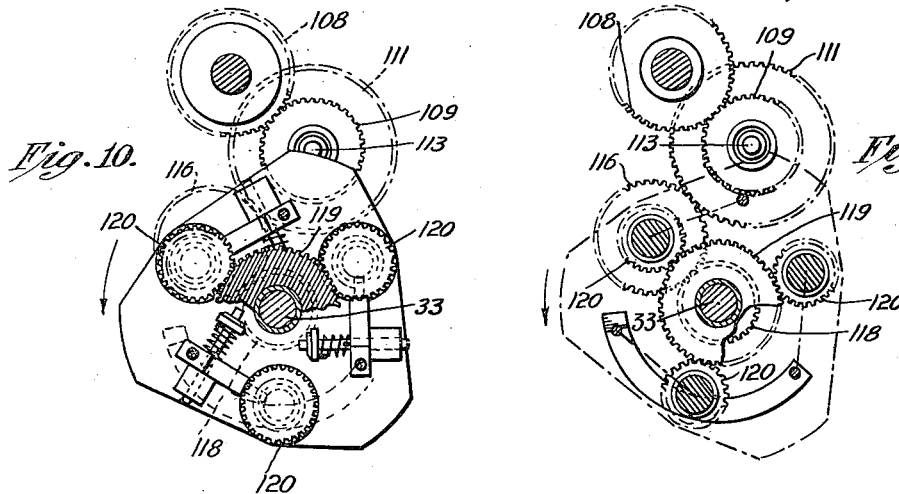
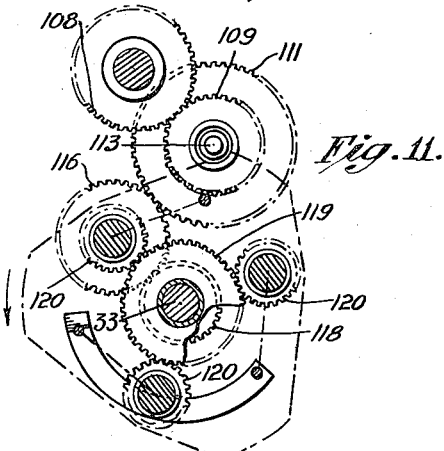
INVENTORS
Rudolph H. Schultz
Adam J. Siebert
BY
Their ATTORNEY March 3, 1942.   R. H. SCHULTZ ET AL   2,274,745
EQUIPMENT TO PRODUCE PACKAGED ROLLS
Filed Aug. 3, 1940    14 Sheets-Sheet 8

INVENTORS
Rudolph H. Schultz
Adam J. Siebert
BY
ATTORNEY

March 3, 1942.   R. H. SCHULTZ ET AL   2,274,745
EQUIPMENT TO PRODUCE PACKAGED ROLLS
Filed Aug. 3, 1940   14 Sheets-Sheet 9

INVENTORS
Rudolph H. Schultz
Adam J. Siebert
BY
their ATTORNEY.

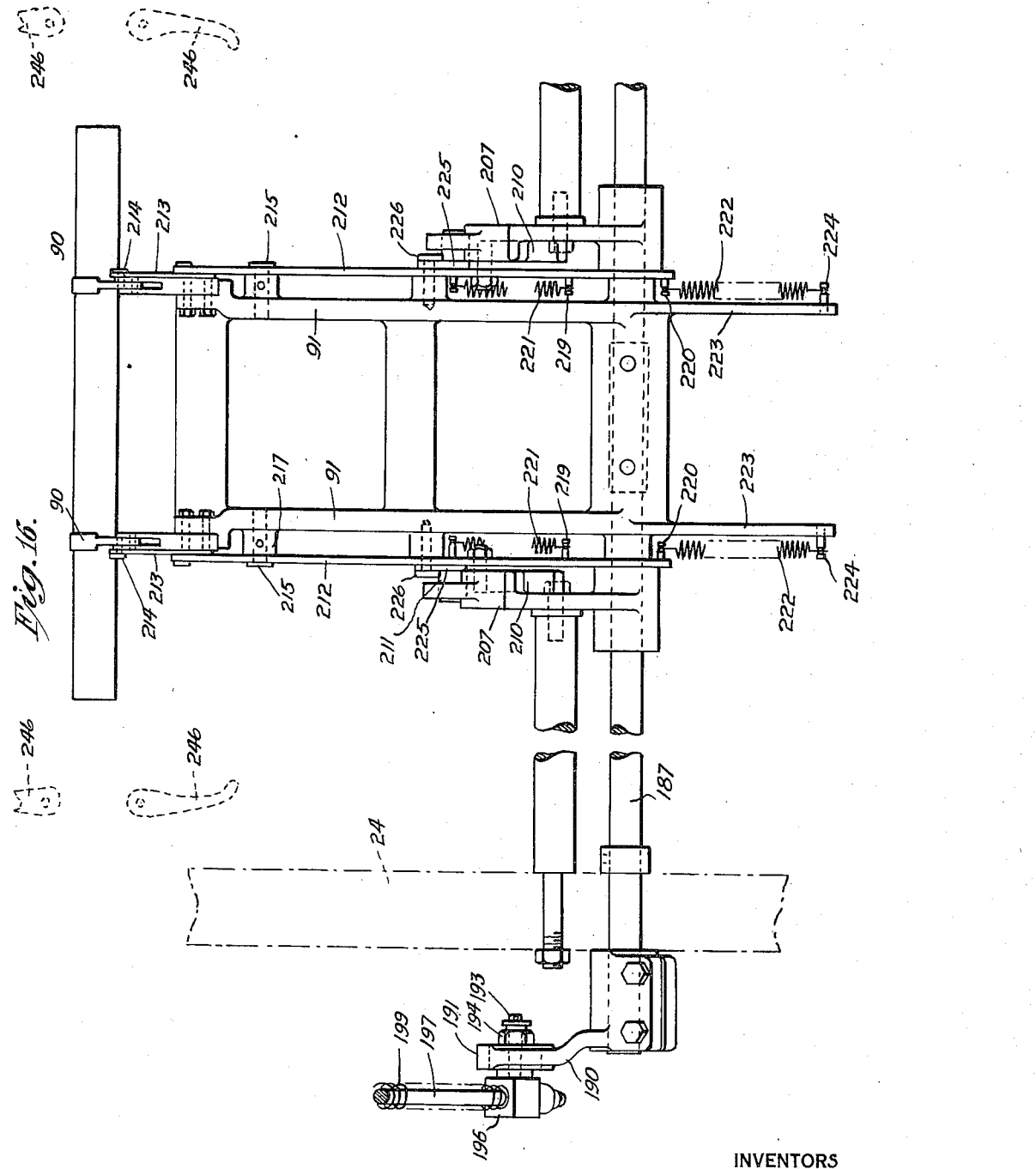

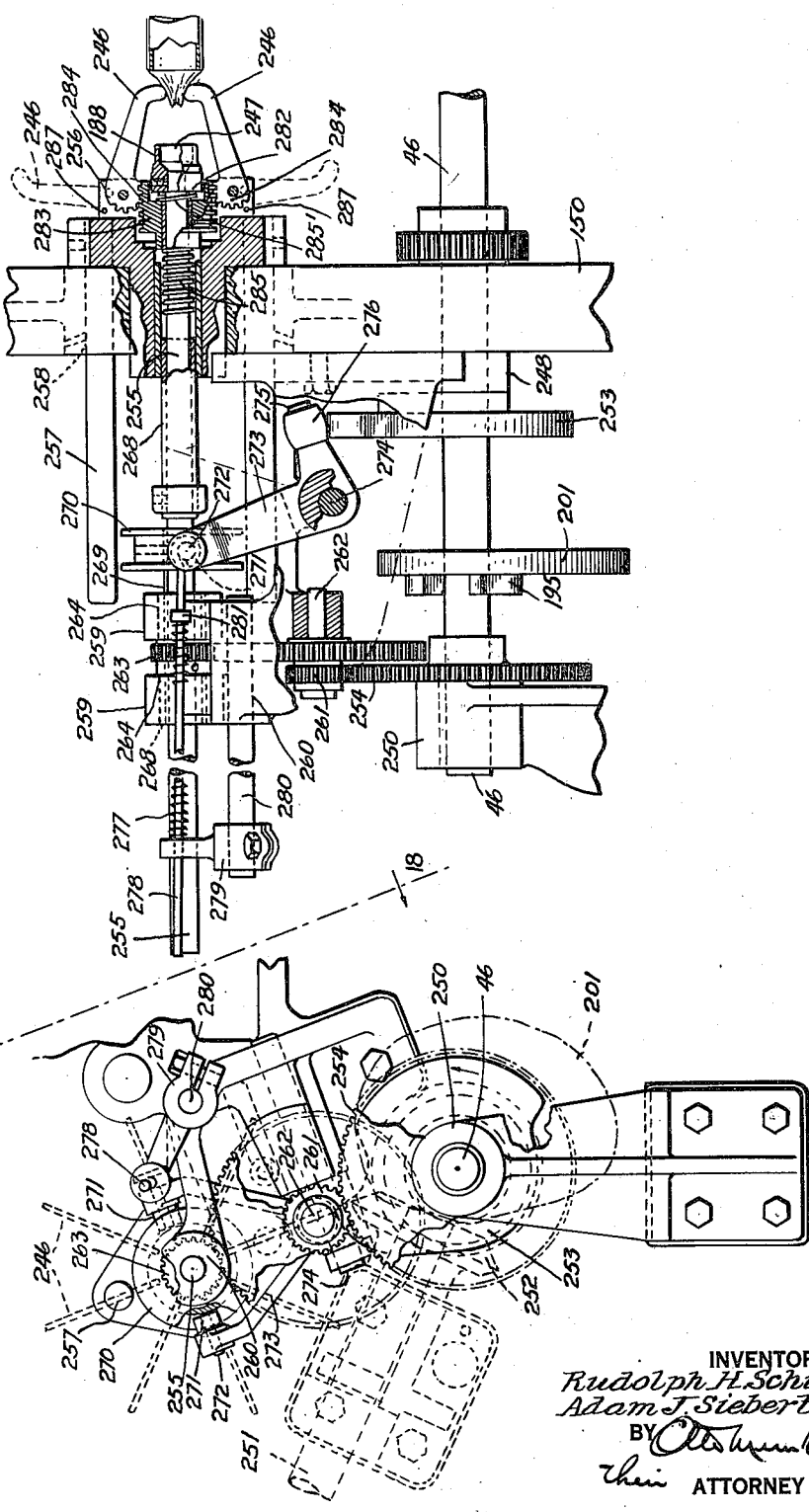

March 3, 1942. R. H. SCHULTZ ET AL 2,274,745
EQUIPMENT TO PRODUCE PACKAGED ROLLS
Filed Aug. 3, 1940 14 Sheets-Sheet 12
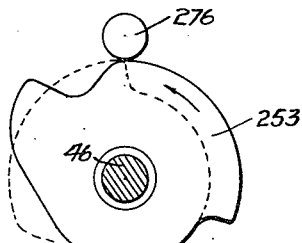
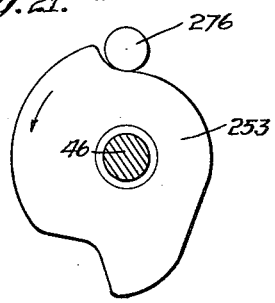
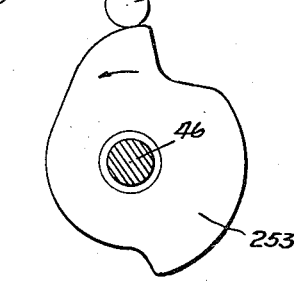
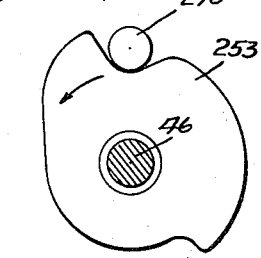
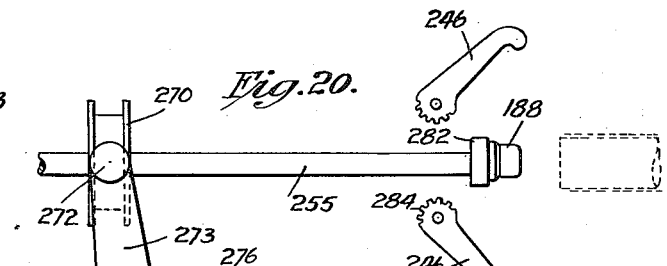
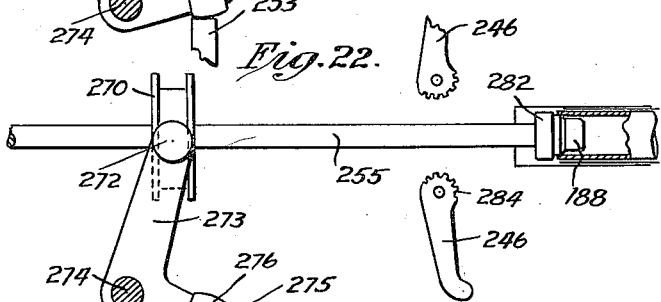
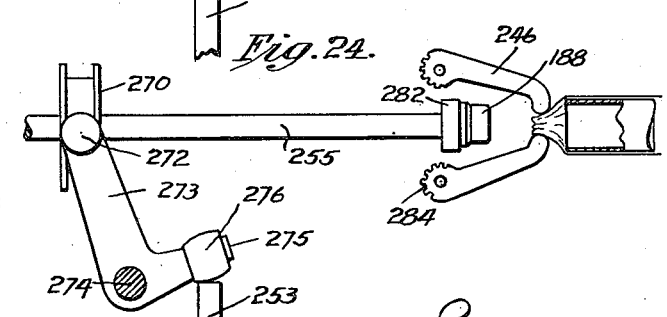
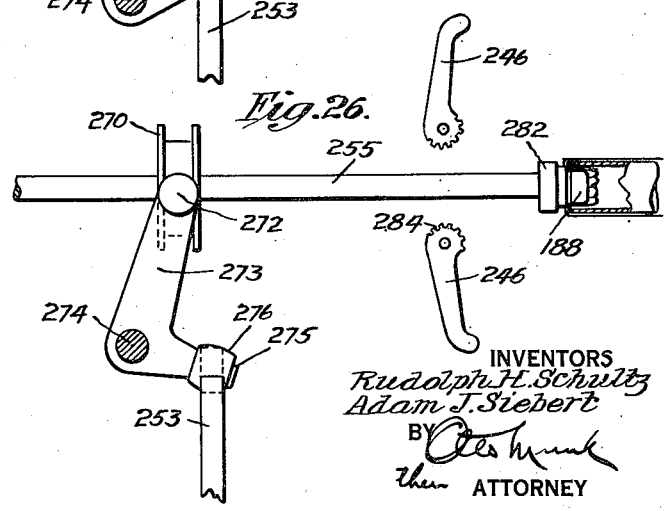
INVENTORS
Rudolph H. Schultz
Adam J. Siebert
BY
ATTORNEY March 3, 1942.  R. H. SCHULTZ ET AL  2,274,745
EQUIPMENT TO PRODUCE PACKAGED ROLLS
Filed Aug. 3, 1940  14 Sheets-Sheet 13

INVENTORS
Rudolph H. Schultz
Adam J. Siebert
BY
Their ATTORNEY

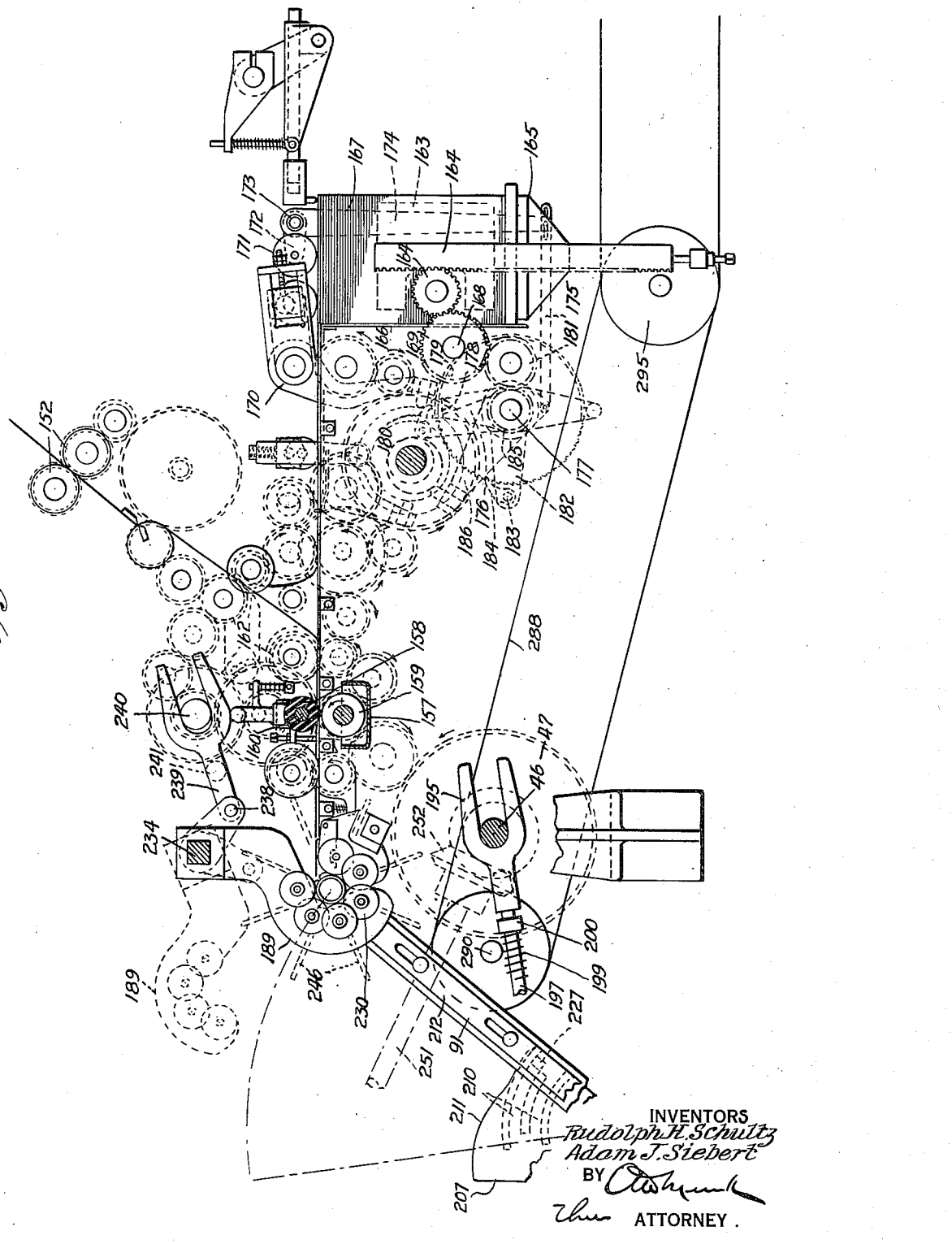

Patented Mar. 3, 1942

2,274,745

UNITED STATES PATENT OFFICE 2,274,745

EQUIPMENT TO PRODUCE PACKAGED ROLLS

Rudolph H. Schultz and Adam J. Siebert, Brooklyn, N. Y., assignors to Schultz Engineering Corporation, Brooklyn, N. Y., a corporation of New York Application August 3, 1940, Serial No. 351,027

18 Claims. (Cl. 93—2)

This invention relates to equipment for producing packaged rolls of thin transparent materials and has reference particularly to equipment for automatically rewinding, wrapping and labelling a plurality of sheets of the material to be rewound.

Briefly, the present invention contemplates handling a plurality of superposed continuously fed webs of material from mill rolls, cutting the webs into sheets and then starting and winding them onto a core, thereafter combining a paper web and a thin transparent web fed from rolls and cutting them into wrappers which are wrapped about the rewound roll and the projecting ends tucked into the ends of the core, and finally placing a gummed and printed label on the completely wrapped and packaged roll.

An object of the invention is to combine into a single unit of equipment the means for producing packaged rolls of sheets of thin transparent material.

A further object of the invention is to produce packaged rolls of materials cut into sheets and continuously fed from rolls supplying the materials.

A still further object of the invention is to provide a machine of the character hereinafter described, in which a combined paper and thin transparent wrapper is cut from a roll and wrapped around a rewound roll, and in which the projecting ends of the wrapper are tucked into the ends of the latter roll to form a package.

And a still further object of the invention is to provide a mechanical unit coordinated with the other units of the equipment to place a gummed and printed label about the completely wrapped and packaged roll.

The objects of this invention are accomplished in an equipment comprising certain novel combinations and arrangement of parts, hereinafter described in the specifications, set forth in the appended claims and illustratively exemplified in the accompanying drawings, in which Figures 1 and 2 constitute a side elevational view of the entire equipment for producing packaged rolls;

Figure 6 is an elevational view of the cutting units;

Figure 7 is an end elevational view of the operating means for the cutting units;

Figure 8 is a substantially longitudinal sectional view of the cutter operating means taken on lines 8—8 of Figure 7;

Figure 9 is an elevational view of the web feed and rewind reel;

Figure 10 is a sectional view of the reel taken on lines 10—10 of Figure 9;

Figure 11 is a sectional view of the reel taken on lines 11—11 of Figure 9;

Figure 16 is a front elevational view of the transfer means;

Figure 17 is an end elevational view of the chuck and tucking in device of the wrapping unit;

Figure 18 is an elevational view looking in the direction of the arrows 18—18 of Figure 17; showing the chuck and tucking parts in section;

Figures 19 to 26 are views of the cam and follower and the tucking fingers and chuck, showing the various respective positions of these parts in one complete cycle of operation;

Figure 29 is a substantially longitudinal sectional view of the wrapping and labelling equipment;

Figure 1:
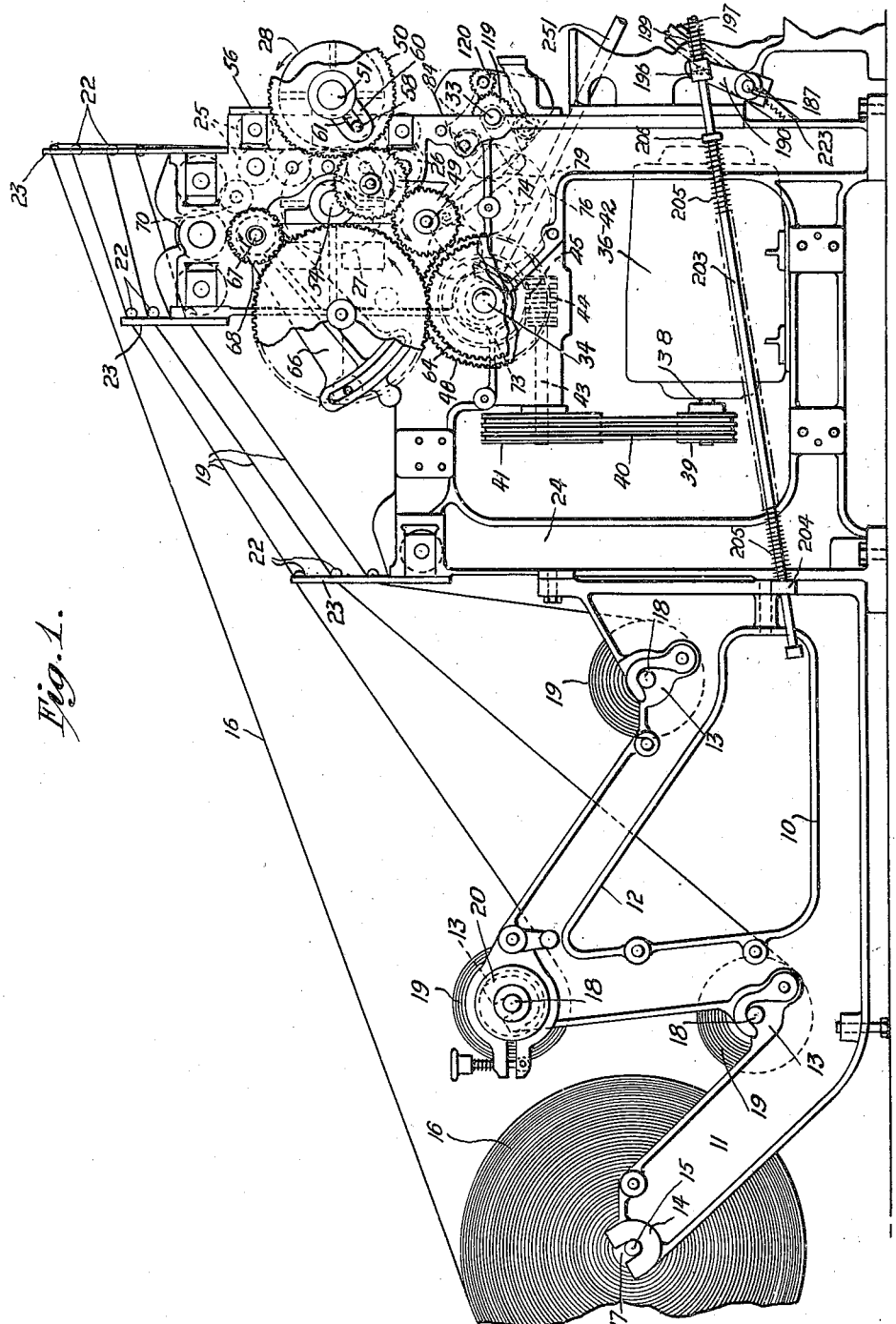

Briefly, the present equipment is capable of turning out from 1000 to 1200 rolls per hour and it requires the services of but a single operator to obtain this production. The machine with its present equipment produces a package containing several sheets of what is known in the trade as "Cellophane." To be exact the package illustrated contains three sheets of "Cellophane" wound upon a cardboard tube with a piece of plain newsprint interposed between the cores of the three sheets. The rewound roll is then wrapped in a combination paper and Cellophane wrapper which is somewhat wider than the roll and allows for the projecting ends to be crumped and tucked into the ends of the tube. The wrapped roll finally receives a gummed and printed label or band which is placed around the outside mid-position of the wrapping and the completed package is delivered by the machine onto a conveyor from which it is taken and placed in boxes and distributed.

The equipment is adjustable to handle "Cellophane" fed from rolls and the variation in width of material may be anything from 18" to 24". The several webs of "Cellophane" are taken from the rolls and brought together with a web of newsprint and the entire material is cut off into lengths varying from 18" to 36" by means of a shear cutting mechanism. The actual variations being limited to differences of not less than 1", i. e. sheets varying in lengths as follows can be obtained: 18", 19", 20" and so on up to and including 36". The several sheets of Cellophane and newsprint are then started upon and wound up onto a cardboard core which is automatically fed into the mechanism from a core hopper. The purpose of interposing the newsprint sheet in the cores of the sheets of Cellophane is to provide an absorbing agent to take up the moisture in the air and facilitate the operation of rewinding by keeping the several sheets of Cellophane from puckering and wrinkling, a condition inherent in this material when subjected to changes in humidity. The operation of starting the sheets on the core after being cut is effected by means of caging mechanism of a type used in regular rewinding machines and described in U. S. Patent No. 1,966,525, issued July 17, 1934.

After the sheets are rewound upon the core, the roll is picked up and transported into a wrapping unit by means of gripper fingers operating at the end of an arm and picking up the roll from a reel, in which the rewind takes place, and carrying it to wrapping cages in the wrapping end of the equipment.

At this point a web comprising Cellophane and newsprint layers is fed to and about the roll and the projecting ends are crimped and then tucked in the ends of the core as previously described. The purpose of using newsprint in combination with the Cellophane wrapper is that the wrapper is preferably the same color as the sheets being wrapped and it affords an opportunity to expose one layer of the Cellophane over a white ground and thus show to a customer the exact shade of the wrapped sheets. Without the white ground the color effect of a number of layers of the Cellophane is very much deeper than that of a single layer.

Mill rolls and supporting frame

Figure 2:
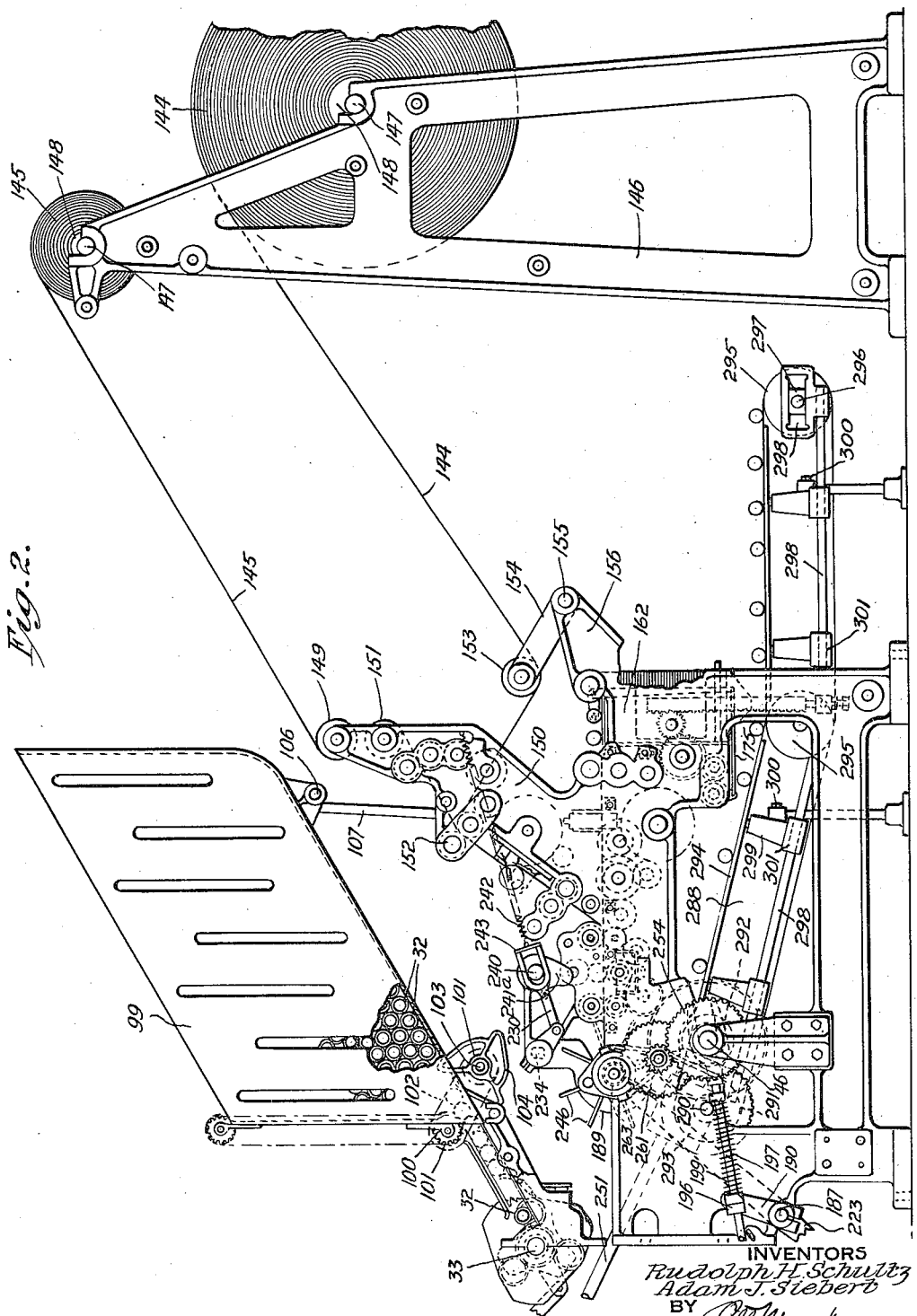
Figure 3:
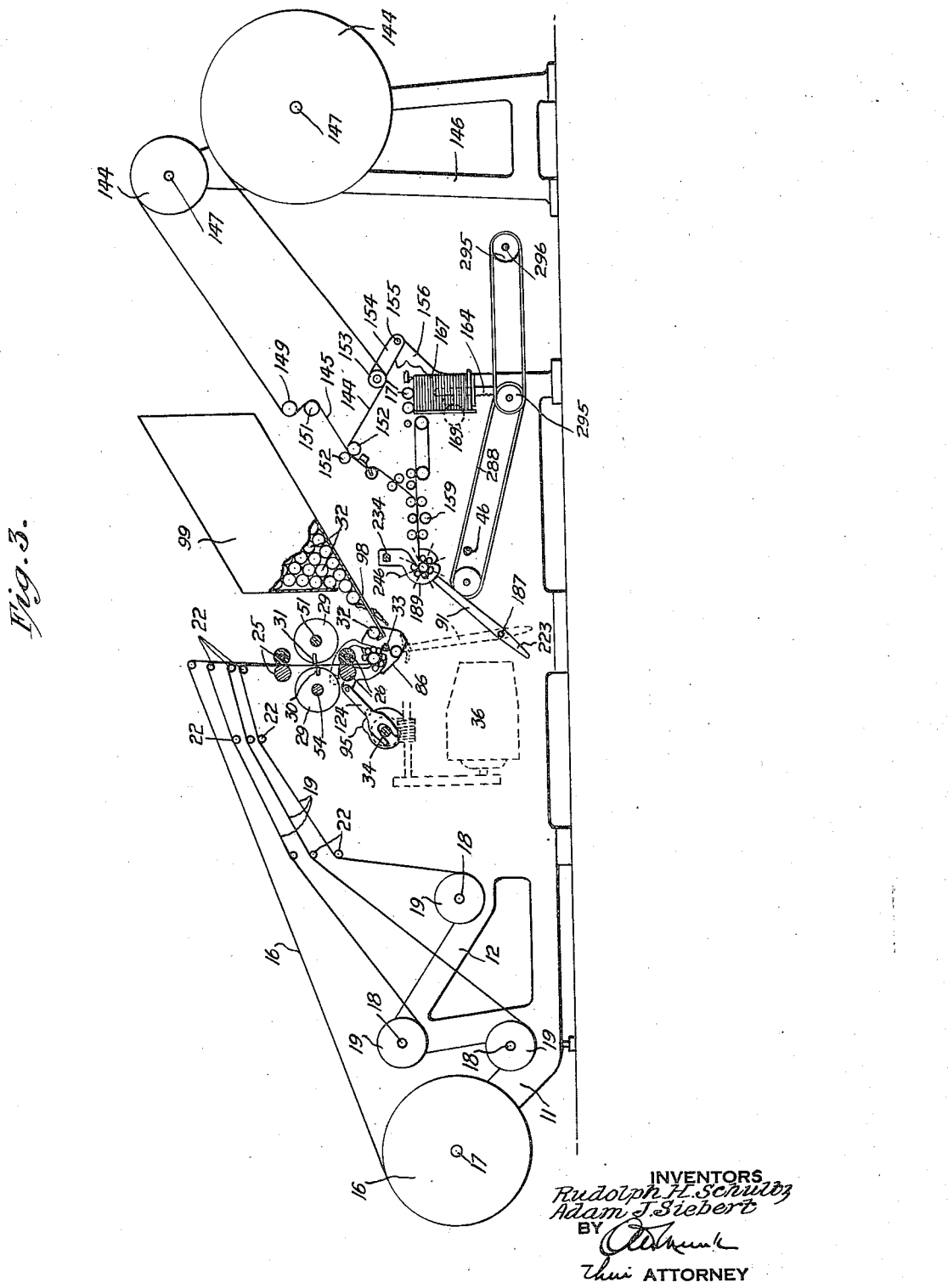
Figure 3 is a diagrammatic view of the equipment showing only the essential elements of the units and the arrangement of the various webs.

Referring to the drawings and particularly to Figs. 1 and 2, 10 denotes a mill roll frame end consisting of side brackets supported along their lower portions upon the floor and provided with outwardly and upwardly projecting arms 11 and an intermediate triangular portion 12, at the angles of which are arranged suitable journal bearings 13. The arms 11 are provided at their free ends with journal bearings 14 in which the shaft 15 of the paper mill roll 16 is supported. The mill roll 16 is held on the shaft 15 by means of cones or chucks 17 projecting into the ends of the core of the roll, one chuck being fixed to the shaft while the other chuck is wedged into the end of the roll. The journal bearings 13 support the spindles 18 of three rolls 19 of the thin transparent material which constitutes the material being rewound. Each spindle 15 and 18 is provided at an outer end with a flanged pulley 20 and an adjustable brake mechanism 21 to prevent unwinding of the rolls 16 and 19 faster than the webs thereof are being fed. Further means are provided to enable the rolls to be adjusted longitudinally thereof to insure proper alinement and register of the several layers of webs one above the other. From the mill rolls the webs are fed into the rewinding unit of the equipment.

Rewind mechanism

The four webs from the mill rolls 16 and 19 travel forwardly and upwardly and are guided over bars 22 arranged at spaced intervals over the rewind mechanism. The webs are separated from each other by means of the bars 22, which are felt covered and which are suspended laterally between uprights 23 on the machine.

The rewind equipment comprises side frames 24, each thereof being substantially a square frame and having its rear upright standard attached to the forward upright standard portion of the mill roll frame 10.

The final set of bars 22 brings all webs into the same vertical plane and disposes them with the paper web uppermost and the three transparent webs directly behind the paper. The four webs descend vertically into the rewind unit and between a pair of upper feed rollers 25, one of which is metal and the other rubber covered, and a pair of lower feed rollers 26 of the same materials and arranged with their common tangent coincident with the vertical line of the webs. The rubber feed rollers of the upper and lower pairs 25—26 are journalled in box bearings yieldably carried on the frame 24 to urge the rubber rollers towards the metal rollers.

Intermediate the upper and lower feed rollers 25 and 26 and arranged on opposite faces of the combined or superimposed webs are the rotary shear or cutting cylinders 27 and 28, each of which comprises a hollow core having radially projecting webs projecting between intermediate and end discs 29. The cutting cylinders are supported in the side frames 24 at an angle to the horizontal, i. e. the cutting cylinders are higher on one side of the machine than they are on the other side. Shear knives or blades 30 and 31 are removably and adjustably mounted, respectively, in the cylinders 27 and 28, and each blade projects radially and is arranged at an angle of approximately one degree from the axis of its cylinder. The web feeds downwardly between the cylinders and the latter in their rotary movement will bring their blades 30 and 31 into engagement at one side of the travelling webs to start the cut and as the cylinders turn with the web the angular position of the blades and that of the cylinders will cause the cut to traverse the web above a line square with the sides thereof. The operation of the cutting cylinders and the means by which they are driven will hereinafter be more fully described.

The leading ends of the webs depend from the lower feed rollers 25 and 26 and are started on a core 32 carried by a rewind reel. The rewind reel comprises a reel shaft 33 journaled in bearings in the side frames 24.

Referring particularly to Figures 4 to 10, the rewinding mechanism comprises in addition to the rotary shear or cutting cylinders 27 and 28, a cam shaft 34 and caging equipment 35, which start the leading ends of the webs onto the cores 32, and the driving mechanisms for the reel carrier shaft 33, the rotary shear cylinders and feed rolls and gearing for securing various lengths of cut sheets and for operating the caging equipment 35.

Power to operate the equipment is supplied by an electric motor 36 which is mounted on a brace or motor base 37 carried on the lower lateral bar of the frame 24. The motor shaft 38 is provided with a pulley 39 for a plurality of belts 40 which run over a pulley 41 of a standard speed reducer 42. The speed reducer is also carried on the motor brace 37 and on its output shaft 43 is mounted a pinion 44 in mesh with a spur gear 45, a sprocket and hand wheel not shown. The spur gear 45 is mounted on and keyed to the cam shaft 34. The sprocket drives a chain which operates a shaft carried by blocks mounted on the machine frame 24. Another sprocket is mounted on the same shaft adjacent the front sprocket that drives the shaft, the second sprocket however, driving the cam shaft 46. A further chain and sprocket connection, also not shown, drives a cam shaft 47 which operates the label feeding end of the wrapping unit. The specific drive mechanism just described provide and distribute the power to the several strategic points in the equipment so that no so-called locking or hard spots will be encountered in the drive of the mechanism.

Referring again to the rotary cutting cylinders 27 and 28, the same are driven from the cam shaft 34 which rotates at a speed of 20 R. P. M., and which on one side of the machine carries a drive gear 48 operating a train of several intermediate gears 49 and a spur gear 50 of the shaft 51 which carries the cutting cylinder 28. The cutting cylinder 28 drives its mate 27 through a gear 52 on shaft 51 and a gear 53 on the shaft 54 of cylinder 27. Both cutting cylinders are of the same diameter, and they are so driven from the cam shaft 34 that they make one revolution for each revolution of the cam shaft itself. One of the gears 52—53, however, is constructed with a backlash plate. This is a narrow plate fastened to one of the gears; both the gear to which it is fastened and the plate having teeth cut in them. This plate and gear then mesh with the other gear on the other cutting cylinder. The width of the one gear on the cutting cylinder is equal to the combined width of the gear on the cylinder plus the thickness of the backlash plate. With the gear to which the backlash plate is meshed with the other gear on the other cylinder, this backlash plate is then set to take out any end play between the teeth of the two gears. This plate can also be set whenever required to take up whatever natural wear would result so that at all times both cylinders drive without any hesitation or stall due to the teeth of these two gears having play or clearance in them.

The above is a general outline of how these cutting cylinders 27—28 are driven. There is however another feature that requires explanation as far as this drive is concerned. Although as explained above the cutting cylinders make one revolution for each revolution of the cam shaft 34, these cutting cylinders do not rotate at a constant speed. In other words, they make one revolution for each revolution of the cam shaft but they travel at different speeds while making this revolution. The reason for this is as explained above. This equipment will cut sheets from the web varying anywhere between 18" and 36" in length. The cam shaft makes one revolution for each roll that the mechanism produces. Each roll contains a certain number of sheets cut to a length between the above limits. Therefore if the mechanism is set so that a length of web of 18" is secured for each revolution of the cam shaft, the cutting cylinders must, at the point where they cut this web, approximate the web speed. If, however, the mechanism is so set that a length of 36" of material is fed through for one revolution of the cam shaft, these cutting cylinders must be set to approximate the speed of the web at the point of cut. In addition, they must be capable of being adjusted and set to approximate the speed of the web between these two limits.

This change in speed of the cutting cylinders is obtained through the mechanism illustrated particularly in Figs. 6 to 8. As explained, the drive gear 48 is mounted on the cam shaft 34 and through several intermediates 49 drives a gear 50 that we stated was mounted on one of the knife cylinders. Actually this gear 50 is mounted on a bushing 55 in the following manner. The knife cylinder shaft 51 on which the knife cylinder 28 is carried is held to the machine by means of several brackets 56. One of these brackets has the bushing 55 in it. The bushing has an eccentric flange 57 bearing against the side of the bracket 56. The outside diameter of the flange is eccentric in relation to the knife cylinder shaft 51. The gear 50 that drives the knife cylinder shaft 51 is mounted on the eccentric flange 57. Fastened to the gear 50 is a stud 58 on which is mounted a cam roller 59. On the portion of the knife cylinder shaft 51 projecting through this eccentric flange bushing 55, is mounted a slotted lever 60, the slotted lever being clamped to the knife cylinder shaft 51. The slotted portion 61 of the lever straddles the cam roller 59 in the gear mounted on the eccentric flange bushing. In this construction variable speeds can be obtained at the point of shearing on the cutting cylinders. In other words, the gear 50 mounted on this eccentric flange, makes one revolution to one revolution of the cam shaft 34 and in turn the cam roller stud 58 being mounted in the slot 61 of the clamp lever 60 drives the knife cylinder shaft 51 on which is fastened the knife cylinder 28, the knife cylinder and shaft making one revolution for each revolution of the gear 50. However, the cam roller stud 58 in the gear 50 travels in an eccentric path in relation to the center of the knife cylinder shaft 51. At various points in its rotary travel the knife 31 in the knife cylinder 28 travels at different speeds. Now, depending on where the slotted lever 60 is clamped to the knife cylinder shaft 51 in relation to the knife 31 in this knife cylinder shaft, the speed of the knife at the point of cutting or shearing of the material can be made as stated above to approximate the speed of the travelling web.

Fastened to the end of the knife cylinder shaft 51 and contacting the slotted clamp lever 60 is a graduated disc 62. The disc 62 is securely fastened to the knife cylinder shaft and the graduations on this disc bear a certain fixed relation to the knife in the cylinder. A pointer or indicator 63 is fastened to the slotted clamp lever 60. Adjustment is made by loosening the clamp lever 60 on the knife cylinder shaft 51 and moving the knife cylinders 27—28 until the indicator 63 on the clamp lever coincides with a graduation on the dial 62 marking the length of sheet to be run. At this point the clamp lever is secured to the knife cylinder shaft 51 and when running the particular length sheet the knife cylinder at the point of shear will approximate the speed of the travelling web.

In addition to the knife cylinders 27—28 making one revolution at a variable speed at different points on their periphery for each revolution of the cam shaft 34, the knife cylinders are set into the equipment at an angle to the horizontal. The feeding web travels through the equipment between these two cutting cylinders vertically. The two cutting cylinders are placed at right angles to the travelling web, but as stated above, on an angle to the horizontal. The combination of placing the shear knives 30—31 in the cutting cylinders 27—28 at 1 degree to the axis of each one of the cylinders and placing the two cylinders at 1 degree from the horizontal, the following result is obtained. The feeding web will be sheared as it is travelling and as the rotary cutting cylinders are turning. In other words, the sheet is cut first from one edge and as the sheet and cylinders travel due to the knives being in the cylinders at an angle, the other side of the sheet will be cut somewhat later. It will be seen that a combination of results are obtained by means of these rotary cutting cylinders. The rotary cutting cylinders do not rotate at a constant speed but in their revolution continually change in speed from a minimum to a maximum. They therefore make one revolution for each revolution of the cam shaft. This allows the cutting cylinders to be set to approximate, as stated above, the travel of the web depending on what the length of the web will be for each revolution of the cam shaft. In addition, they shear the travelling web starting the cut on one edge of the web and completing it on the other edge as the web and the cylinders are travelling, producing a cut that is square with the side of the web.

The length of web secured for each revolution of the cam shaft 34 is varied and controlled as follows. Various size change gears are employed to secure the several different lengths in the following manner: Mounted on a clamp hub on the outside of the frame 24 on one side of the machine and fixed on the cam shaft 34 is a change gear 64. The size of the change gear 64 used determines the amount of material fed by the rewinder in one revolution of both the cam shaft 34 and the cutting cylinders 27—28. The drive from the change gear 64 to the feed rollers 25 in the rewinder is as follows:

An 80 tooth 8 pitch gear 65 in this instance is mounted on a swinging plate 66, the swinging plate pivoting on a shaft 67 to which is fastened a handwheel, not shown. The gear 65 on the swinging plate meshes with the change gear 64, the swinging plate gear 65 in turn meshing with a 48 tooth 8 pitch gear 68 that is securely mounted to the handwheel shaft 67. Securely mounted on this handwheel shaft in turn is a gear 69 containing 24 teeth, ½" circular pitch, which meshes with a gear 70 meshing with one of the gears 71 on the feed rollers 25.

It will be seen from the above description that if a 72 tooth 8 pitch change gear 64 is used on the cam shaft 34 with the 48 tooth 8 pitch gear 68, this gear being driven through the 80 tooth swinging plate gear 65 will make exactly 1½ revolutions. 1½ revolutions of this 48 tooth 8 pitch gear 68 also turns the handwheel shaft 67 1½ revolutions and the 24 tooth ½" circular pitch gear 69 makes 1½ revolutions or moves 36 teeth. This is equal to feeding 18" of material by means of the feed rollers 25 which are exactly 12" in circumference.

If the 72 tooth change gear is replaced with a change gear containing 120 teeth, the feed rollers through the same train of gearing as above will feed 30" of material.

In order to obtain variations in the length of material fed by the feed rollers 25 between 18 and 36" it is necessary to employ change gears 64 of varying sizes, each 4 teeth on a change gear denoting an additional length of material. In other words, a 72 tooth change gear will secure webs 18" in length between each cut. A change gear containing 76 teeth will secure a length of 19", and so forth. In other words, one tooth on a change gear gives an additional ¼" in the length of the web fed for one revolution of the cutting cylinders 27—28.

When paper is run through the equipment the web is fed through the upper feed rollers 25 and passes downwardly in a vertical direction between the two cutting cylinders 27—28 and then continuing feeding in a vertical line it passes between the lower pair of feed rollers 26 below the cutting cylinders. This lower pair of feed rollers 26 are driven by a series of intermediate gears 72 from the upper pair of feed rollers 25.

The drive from the cam shaft 34 to the reel shaft 33 is accomplished as follows: Mounted on the cam shaft on the outside of the frame on one side of the machine is a 32 tooth 8 pitch gear 73 which drives another 32 tooth 8 pitch gear 74 located some short distance away from the cam shaft in approximately a horizontal line through an intermediate gear 75 mounted on a stud 76, the gear having 31 teeth in it. For each revolution of the cam shaft gear 74 with the 32 teeth in it will also make one revolution. Gear 74 has fastened to it a circular disc 76 that has a flat 77 on its periphery. The flat 77 from the center of the disc and from the start of the flat on the periphery has an included angle of approximately 100 degrees. This disc carries a stud 78 on which is mounted a link 79. The other end of the link 79 is pivoted to a bell crank lever 80 pivoted on the reel shaft 33. The other end of the bell crank lever 80 carries a stud 81 and a pawl 82. For each revolution of the cam shaft 34 the disc 76 operates the bell crank lever 80, which moves through an arc of approximately 123 degrees and returns to its initial or starting position. While this bell crank lever 80 moves the pawl 82 through an arc of approximately 123 degrees, the pawl engaged in a tooth 83 in a Geneva 84, which is fixed to reel shaft 33, turns the Geneva through an angle of 120 degrees. It will be seen that the reel shaft 33 moves 120 degrees and comes to rest for each revolution of the cam shaft 34.

The reel shaft 33 comes to rest after being moved through an arc of 120 degrees by means of the bell crank 80, operated through the link 79 and the circular disc 76, with the flat 77, the circular portion of the disc at this point tends to lock the reel shaft in position and make it immovable due to the circular portion of the disc engaging with a concave portion 85 of the three pointed Geneva fastened to the reel shaft 33, the Geneva being operated on by the pawl 82. It will be noted that the three notches or cutouts 83 in the Geneva are spaced 120 degrees apart. Between the notches 83 are the three concave portions 85 the radius of each one of them conforming to the outside diameter of the disc 76. As the circular portion of this disc moves into a concave or cutout portion 85 of the Geneva, the latter and the reel shaft 33 to which the Geneva is fastened is locked in position as long as the circular portion of the constantly rotating disc rides in the concave portion 85. At the point where the reel shaft 33 is again to be operated the circular portion of the disc has travelled to a position where the flat 77 on the disc faces the concave portion of the Geneva. At this point the pawl 82 again operates the Geneva through the bell crank 80 and linkage from the constantly rotating circular disc 76. It will be seen that this arrangement is a combination of a ratchet which is pawl operated with the added feature or advantage of a Geneva lock which is secured by means of the circular disc with the flat working in the concave portion of the Geneva.

It will be recalled that there is a gear 73 on the cam shaft 34 which drives the gear 74 through an intermediate gear 75, the gear 74 having mounted on it the circular disc 76. For every revolution of the cam shaft the circular disc with the flat makes one revolution. Each revolution of the cam shaft produces a complete rewound and wrapped roll which is delivered from the mechanism. The reel shaft 33 remains in the stationary position for 180 degrees of cam shaft rotation while the pawl and operating lever move through an arc of 120 degrees in a backward direction as the disc moves through an arc of 180 degrees; at which point the pawl again picks up the next notch of the Geneva having the three concaves and as the circular disc moves through the arc of 180 degrees it operates the linkage 79, the lever 80 and the pawl 82 to advance the reel shaft 33 and Geneva through another arc of 120 degrees. In other words, the reel shaft 33 rotates intermittently, remaining stationary for 180 degrees of the cam shaft travel and then moving through an arc of 120 degrees for the other half revolution or 180 degrees of the cam shaft travel. While the reel shaft remains in this stationary position as the cam shaft moves through an arc of 180 degrees, certain operations are performed by the cam shaft which will be described further on in the description.

Fixed on the reel shaft 33 are two reel plates 86, each thereof having three sets of chucks 87 spaced 120 degrees apart. Each of these chucks of a reel plate is in line with its mate in the opposite reel plate. At the point where the reel plates and reel shaft 74 start rotating after the reel with the chucks have moved approximately 5 degrees from the starting point, two of the alined chucks 87 engage a stationary circular ring cam 88 mounted against the inside of each frame 24. The cams operate the chucks so that they project toward each other. At the point where the chucks are released and move toward each other, the ends of the chucks engage one of the cores which has been fed from a reserve supply of cores contained in a core hopper 89. The core 32 rests in a position where the alined chucks in each reel plate when released enter the ends of the core and pick it up from the chute of the core hopper and carry it through the balance of the partial revolution of the reels. At the point where the reels again come to rest the core is in such position that the caging mechanism 35 closes around it and operates to start the leading ends of the several combined webs around the core. The reel and chucks operate in a manner similar to that of the reels in our U. S. Patent No. 1,966,525, issued July 17, 1934, with the exception that in the patented device the reels are constantly rotating. At the point where the leading end of the web has been started on the core as mentioned above, by means of the caging mechanism, the caging mechanism again opens and after it is open the reel operates to move the core, on which the several webs are rewinding, through an arc of 120 degrees where the rewinding of the webs is completed. The core with the several webs in the lower position as just explained, rotates until such time as the reel is again operated. After the reel moves through an arc of approximately 5 degrees, the rewound roll rotating between the chucks is released by the chucks through the circular ring cams that withdraw the chucks from the ends of the roll. At this point the roll is taken by means of grippers 80 and carried in an arm 91 and moved to the wrapping mechanism. The gripper mechanism will be more fully described in the following description.

It has been described above that the several webs are combined and fed between a pair of feed rollers 25 placed above the rotary cutting cylinders 27—28. The webs after passing through the feed rollers 25 travel in a vertical direction between the cutting cylinders and are engaged by a second pair of feed rollers 26 located below the cutting cylinders. For each revolution of these cutting cylinders the feeding web is severed. After the web is severed by the cutting cylinders the severed sheets are still held or pinched and fed by means of the lower pair of feed rollers 26. However, after the several webs pass through the lower set of feed rollers the leading end feeds downwardly to a point where the caging mechanism 35 closes around the web and core 32 carried in the core carrier or reel plates 86 and is fed around the core by means of this caging mechanism until 1 to 2 wraps are secured on the core. At this point the caging mechanism opens and the rotating core rotating in conjunction with the feed rollers completely rewinds the web on the core. Incidentally, the core rotates at a somewhat greater surface speed than the positively fed web which is pinched between the feed rollers 26. The core operating at a faster surface speed tends to hold the web taut as it is rewound on the core. The core through a friction mechanism, which will be hereinafter described, slips so that after the leading end of the web is started on the core it travels at the same speed as the incoming paper. While this web is started on the core and is securing its 1 to 2 wraps around the core, the cutting mechanism is operating to sever the sheet from the feeding web. The point at which this severing takes place depends on the length of the sheet being out. Where the shortest sheet is being cut, i. e. a sheet of approximately 18″ in length, the cut takes place at the point where the 1 to 2 wraps have just been secured around the core. Where the web is being severed every 36″ considerably more than 2 turns will be secured around the core before the point of cutting of the sheet from the web.

The caging mechanism 35 consists of a pair of cages or jaws 92, the cages or jaws comprising rods 93 carrying fibre discs or rollers 94 which interlock with each other. On the closing of the two cages or jaws, the fibre rollers 94 of the two cages also interlock with each other presenting an unbroken interlocking surface around the periphery of the core. The leading end of the web feeds down to the lower cage 92 between the first fibre roller 94 and the core 32 and is carried around the core by means of the battery interlocked fibre rollers. The lower cage is driven at approximately paper speed. The upper cage is constructed so that all of the fibre rollers 94 are yieldably held against the periphery of the rotating core, the upper cage in this instance not being driven positively, but only through frictional contact with the core.

The present cages 92 are of a length which allows their ends to ride on the chucks projecting into the ends of the core so that the cages when closing at high speed do not slam and tend to break or distort the core, the blow of the cages being taken by the chucks that hold the core. This is an improvement over our previous construction in which the cages were just the length of the core and a somewhat heavier core than necessary had to be used and the speed of the core also had to be limited because the strength of the ordinary core was not great enough to withstand the blow of the closing cages. The present cages 92 are operated by a cam 95 carried on the cam shaft 34. The cam shaft as stated above produces a complete article or roll for each revolution. The cam 95 is shaped to provide a low track 96 to close the cages around the core and at the point where they have closed the leading end of the web is just up to the core and after 1 to 2 wraps of the leading end have been secured around the core the high track 97 of the cage cam opens the cages. The reels are again rotated as explained above and the rewinding of the web continues on the core on which it started.

As explained above, the cores are fed automatically from the core hopper 89 and then along an inclined chute 98, so that a core is always in such a position that the reel rotates intermittently, the chucks 87 are released and project into each end of the core, thereafter removing the core from the taking position and carrying it to a position where the several webs are rewound up on it. As soon as a core is taken by the chucks another core immediately takes its place to be acted upon by the following set of chucks in the reel. The core hopper 89 consists of two side plates 99 having projecting ledges projecting at right angles thereto. These side plates are adjustable, in relation to each other so that cores of varying length can be accommodated, moving the plates either toward or away from each other to suit the length of the cores. Fixed to the right angle ledge on each one of these hopper side plates are several brackets 100 mounting sprockets 101. The sprockets carry chains 102 which operate a shaft 103 on which are mounted several three prong arms or discs 104. The prongs or discs 104 rotate slowly and assist in agitating the cores held in the hopper. The distance between the bottom ledge of the hopper side plates and this lower agitating sprocket and chain is such as to allow one core to drop out of the hopper at a time. This core after leaving the hopper progresses along the inclined chute 95, which chute is adjustable so that the incline can be set to conform to a point where the chucks in the reels are released and project into the core which is being fed by a core stop 105 at the end of this inclined chute.

It will be seen from the above description that the hopper consists of two sides which are adjustable in relation to each other, these sides having projecting fins facing each other and acting as retaining walls for holding the cores in the hopper. In addition there are the agitating chains 102 one on each hopper side plate and the several three-cornered or pronged discs 104 to agitate the cores. The cores then feed one at a time from the hopper between the chain and the sprockets and the lower ledge or table of the hopper into an adjustable inclined chute 98, the entire chute being mounted on a rod, the end of the chute having an adjustable end stop 105 so that the core at the end of the chute can be positioned in relation to the chucks which project inwardly to hold it on its ends. The cores that rest in this chute are also held in position by means of side guides and upper guides. Both the side guides and upper guides are adjustable with respect to each other to be able to accommodate varying diameter cores and also various length cores. This entire hopper chute and hopper is supported in several brackets that are mounted on the frames of the machine. The hopper 89 itself is simply set into a slot in these brackets and can be removed from the brackets as a complete unit. The hopper is held so that the bottom is at an angle to allow the cores to work out of the exit created by the sprocket and chain and the bottom of the hopper. The back end of the hopper is adjustable so that the hopper can be either elevated or depressed as may be required. This is done by means of a rod or shaft 106 which projects through the two side plates 79 and is provided with an adjustable rod 107 which rests or bears against the frame 24 of the wrapping equipment so that by adjusting the hopper along these rods the back end as stated above can be changed as far as the angle at which it stands is concerned.

Referring again to the reel construction, it was stated that the chucks which rotate the core are frictionally driven at a peripheral speed somewhat greater than the speed of the incoming web and the moment the incoming web is started on the rotating core the core immediately conforms to the speed of the oncoming web. Incidentally, the chucks carried in the reels rotate constantly. The drive to the chucks 87 with provision for frictionally driving them is as follows: Fixed to the shaft of the lower roller 26 and adjacent the inside of each frame 24 is a gear 108. Each of the two gears 108 meshes with and drives a smaller gear 109 having disposed against its face a friction disc 110. The other side of this friction disc 110 bears against a larger gear 111. The gears 111 with the friction disc are carried in a bracket 112 fastened to each one of the frames 24. The stud or shaft 113 on which the gears 109—111 are mounted is adjustable by means of a small knurled wheel 114. By adjusting the wheel 114 to increase or release pressure of a compression spring 115 yieldably pressing the one gear towards the other, and against the friction disc 110 the latter regulates the point at which the one gear will slip in relation to the other. The gear 111 meshes with small gear 115 mounted on a stud 117 carried on the frame 24. The small intermediate gear 116 in turn meshes with the smaller gear 118 of a compound gear 119 which forms the sun gear and drives satellite gears 120 operating the rewind chucks 87 which project into the core and hold the core until such time as it is released after the material has been rewound upon it.

Figure 4:
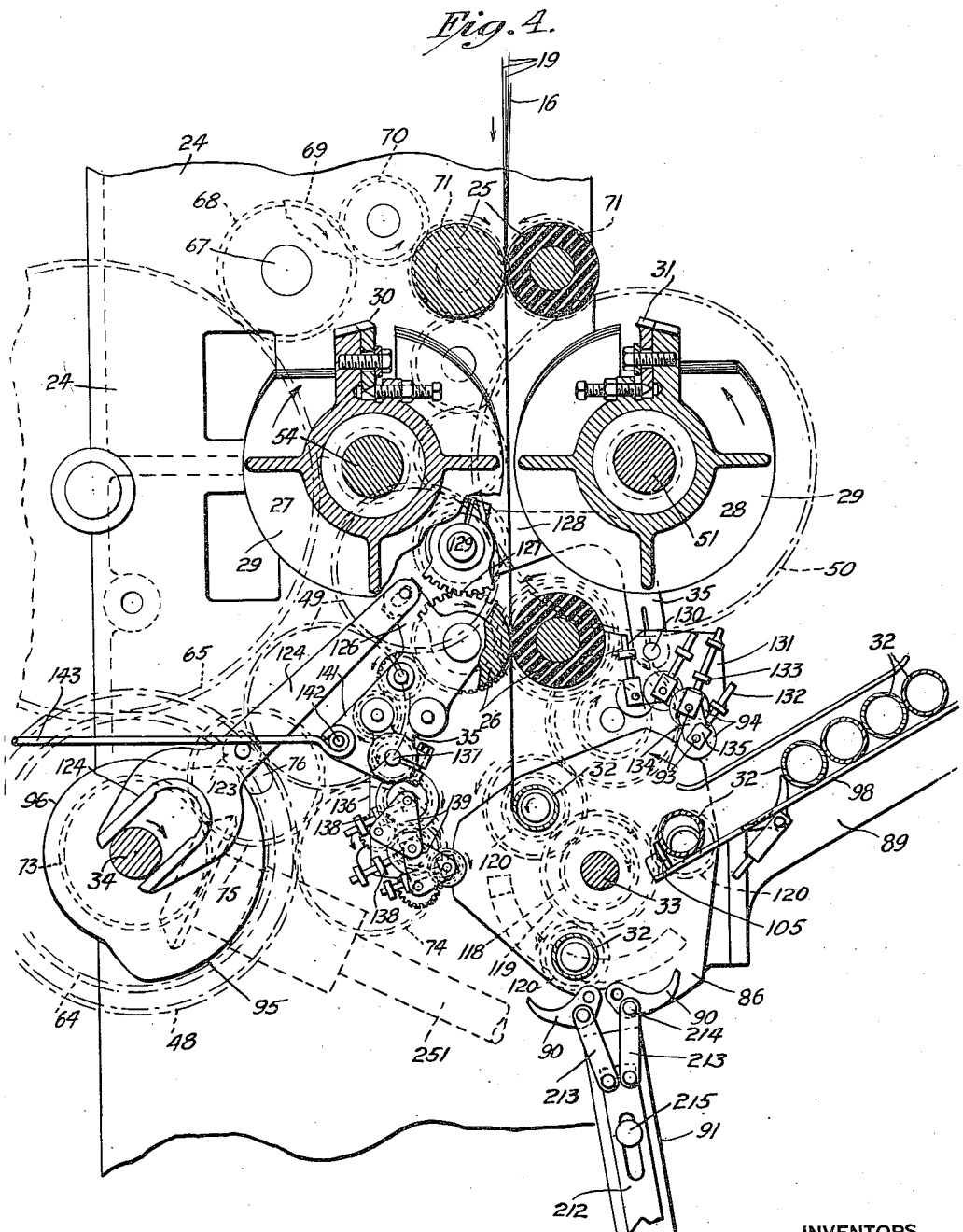
Figure 4 is a substantially longitudinal sectional view of the feed, cutters and reel and caging units of the rewind equipment.
Figure 5:
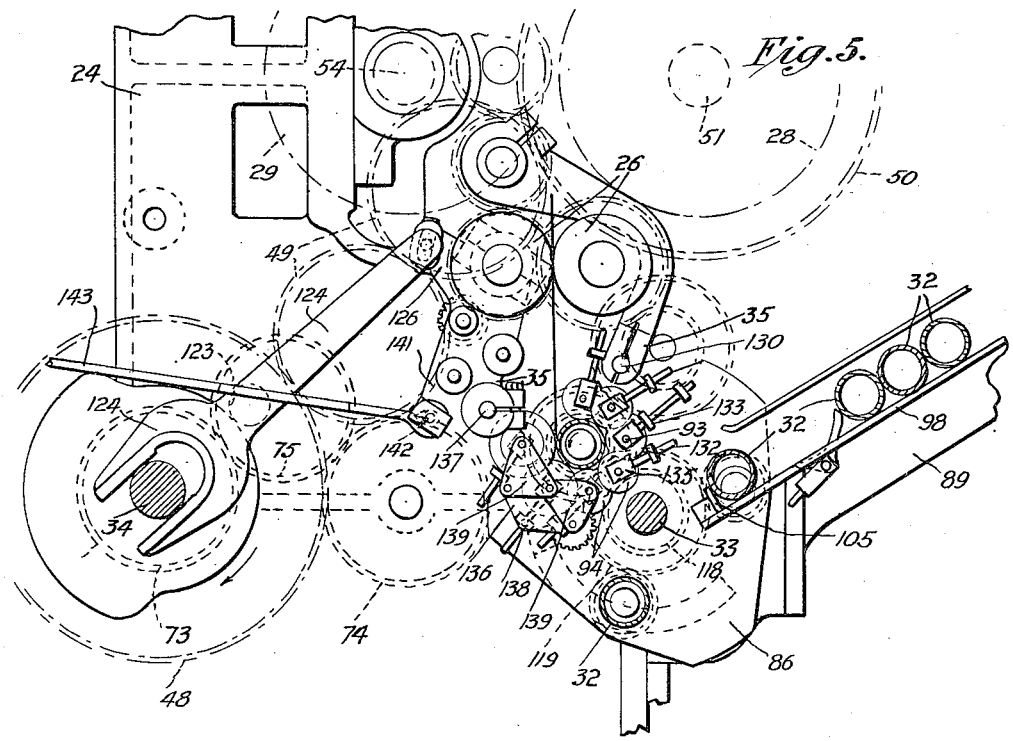
Figure 5 is a side elevational view of the parts shown in Figure 4, and with the cage in closed position on a tube carried by the reel.
Figure 30:
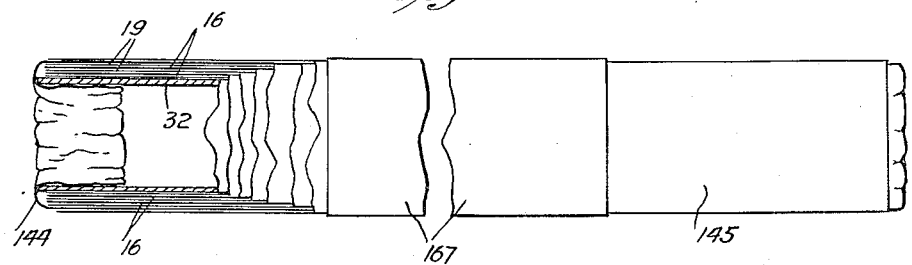
Figure 30 is an elevational view of a packaged and labelled rewound roll showing a portion thereof in longitudinal section.
Figure 13:
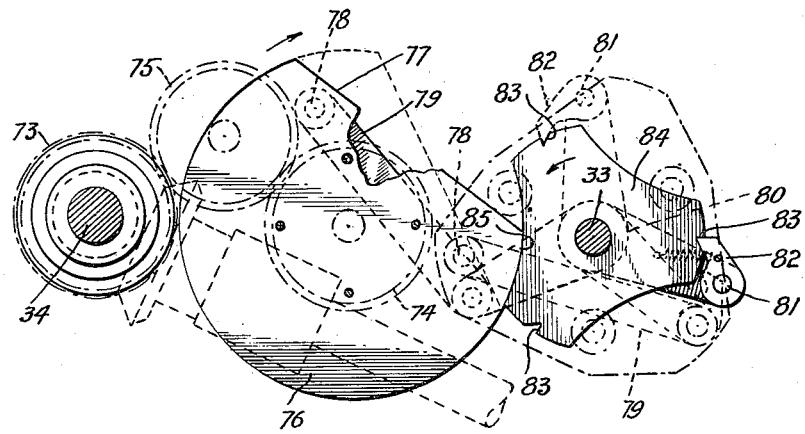
Figure 13 is a side view of the parts illustrated in Figure 12.
Figure 12:
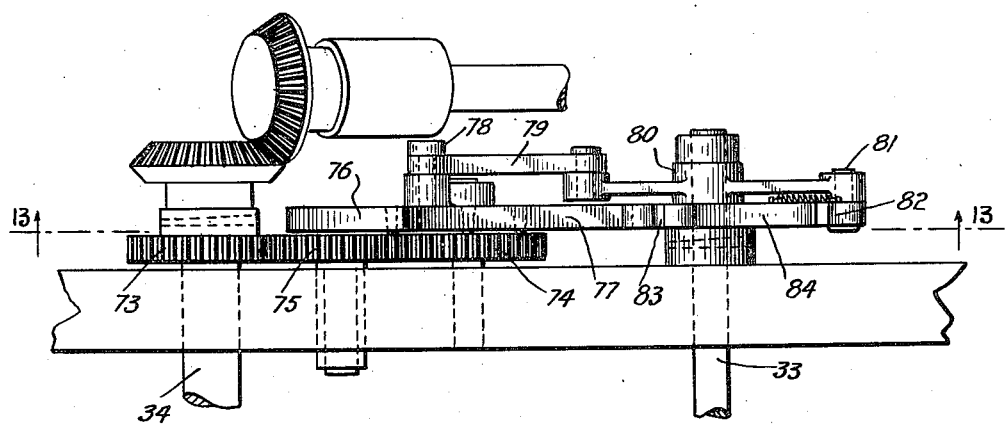
Figure 12 is a detail view of the drive operating the rotary movement of the reel.
Figures 14, 15:
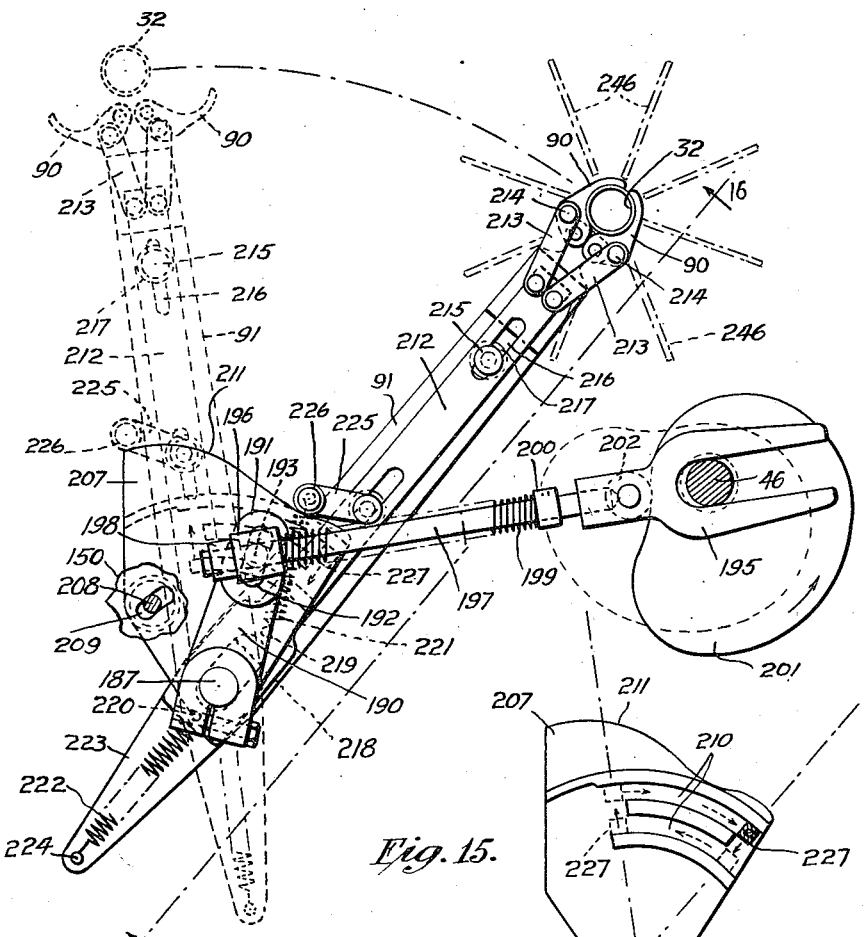
Figure 14 is a side elevational view of the means used between the rewind and wrapping units to transfer the rolls from one to the other.
Figure 15 is an elevational view of the cam tracks and cam plate for controlling the operation of the transfer means of Figure 14.
Figure 27:
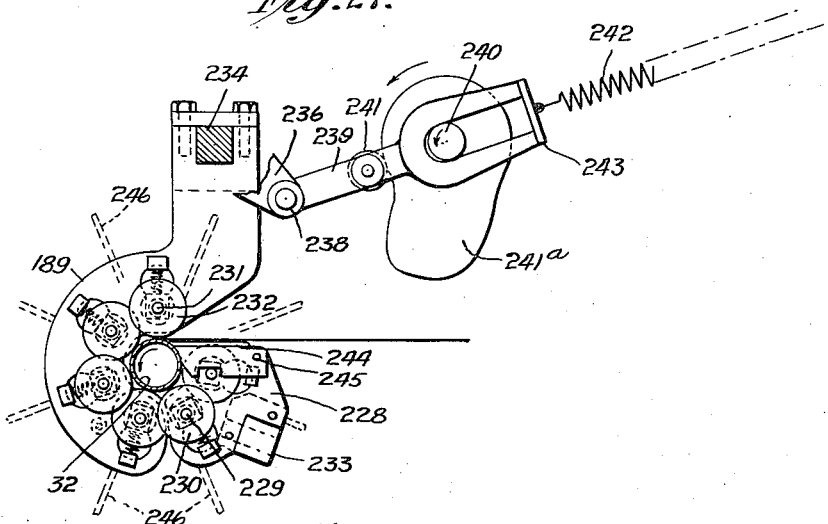
Figure 27 is an elevational view of the wrapping cage in closed position to wind the wrapper onto the rewound roll.
Figure 28:
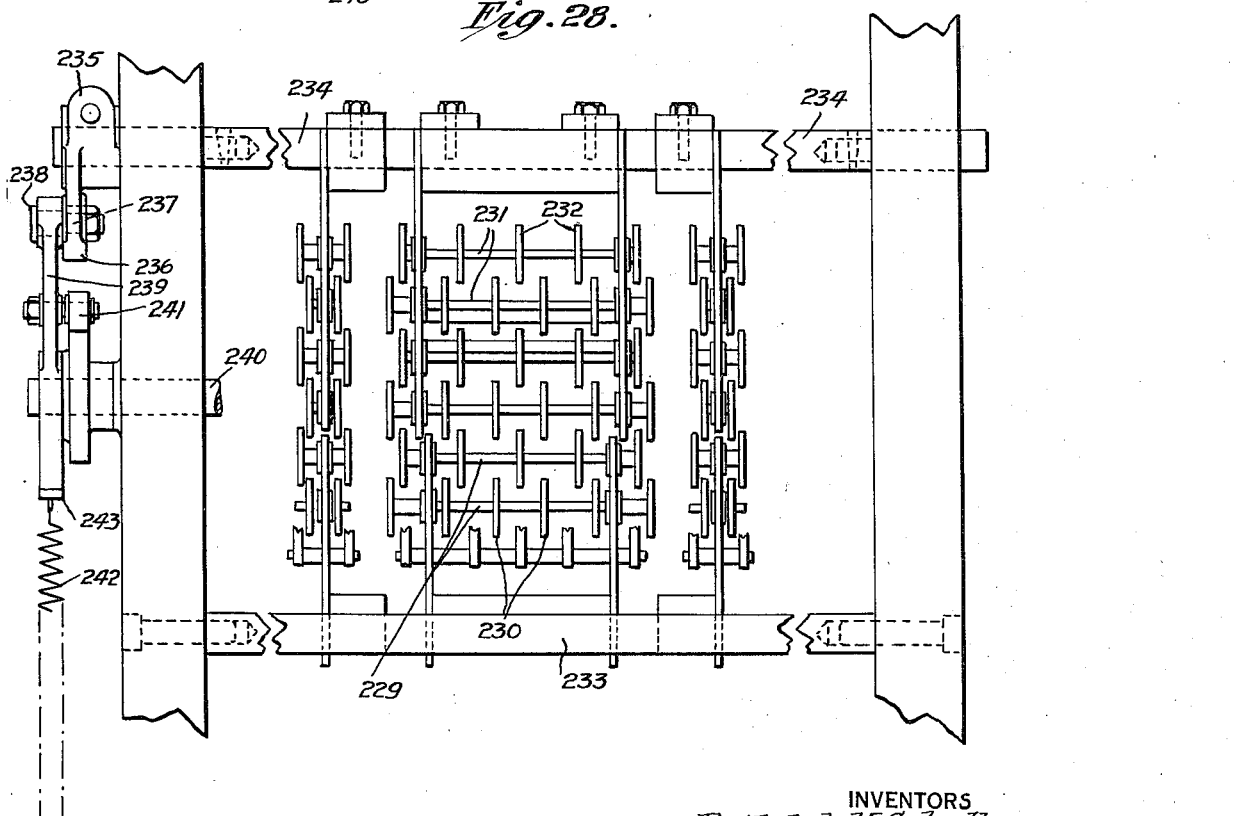
Figure 28 is a plan view of the cage showing the discs in a development to illustrate their relative positions.

Referring now to the means for operating the caging mechanism reference will be had particularly to Figs. 4 and 5, illustrating the operation and drive for the caging mechanism, which starts the leading end of the continuously moving web onto the core 32 after the core carrier or carrier reel 86 has positioned this rotating core to receive the web as it leaves the lower set of feed rollers 26, the several webs feeding downwardly from the rollers 26 in a vertical direction. As explained, the caging mechanism consists of an upper and a lower cage 35 or pair of jaws carrying a series of rods 93 on which are located interlocking fibre discs 94. The fibre discs 94 on one of the lower cage rods interlock with the fibre discs 94 of one of the upper cage rods when these jaws are in the closed position around the core. The lower cage rollers including the rods and fibre discs are driven or rotated through gears 121 at approximately the speed of the advancing web. The upper cage rods and fibre discs are yieldably held against the periphery of the core and the chucks which rotate the core and are driven through frictional contact with the core and the chucks. The upper and lower jaws or cages close around this core at the point where the leading end of the feeding web is just contacting the core and the cages remain closed around this core until the advancing or leading end of the webs have made one to two wraps around the core. At this point the cages open. The rewinding of the web on the core meanwhile proceeds and as soon as the cages have opened sufficiently the reel, containing the rotating core with the several webs winding thereon, is moved through a path of 120 degrees to a point where the reel again comes to rest; the core and the several webs during this movement are still rewinding on the core. After the core has reached this position the trailing ends of the cut webs are released by the lower feed rollers 26 and the trailing ends wind up on the core. The trailing ends are held against the core by means of several spring plates 122 which yieldably hold the loose ends onto the core. These spring plates will be described more clearly further on in the description.

The operation of both the upper and lower cages 35 is accomplished by means of the cage cam 95 mounted on the cam shaft 34 and a cam roller mounted on a fork 124, the other end of the fork being pivoted to one of the lower cage levers 125.

It will be noted that the two lower cage levers 125 are mounted on the shaft on which is rotatably mounted the lower metal feed roller 26. Outwardly of both of these two lower cage levers 125 and securely fastened to the oscillating shaft between the cage levers and the frames is securely mounted a segment gear 126. The segment gears 126 on the oscillating shaft mesh and operate mating segment gears 127 on each of which is fastened an upper cage lever 128. Both of these upper cage levers 128 with their mating segment gears 127 are rotatably mounted on projecting studs 129 held in the respective frames in line with each other.

One of the lower cage levers 125 has a projecting ear or lug to which is pivotally connected the cam fork 124. It will be seen that as the cam shaft 34 rotates, the fork and cam roller 123 bearing against the cage operating cam 65 will move either toward or away from the center of the cam shaft 34 and due to the cam fork 123 being pivotally mounted onto the ear of one of the lower cage levers 125, this lower cage lever will pivot or oscillate on the oscillating shaft from which it subtends. The other lower cage lever is also mounted on the oscillating shaft and is in line with the first mentioned cage lever. Therefore as the oscillating shaft swings through a certain angle both of these lower cage levers move in a predetermined arc swinging from the center of this oscillating shaft. The lower cage levers and the upper cage levers will operate in unison, either opening up by both levers moving away from each other or closing by both levers moving toward each other, depending on the cage operating cam shape or profile which determines the throw or stroke of the cam roller and cam fork.

A rod 130 is fixed in the ends of both upper cage levers, extends the full width between the cage levers, and is mounted at its ends in two plates 131, the plates being securely fastened to the rod and in line with each other. Fastened to each one of these cage plates 131 are poppets 132 that are held in swivel studs 133, the poppets being yieldably mounted and tied together by means of links 134 projecting one poppet to the other. These links maintain a fixed distance between the poppets so that the interlocking rollers 94 which are mounted on rods 93 journaled in a bushing 135 on these poppets, do not bear against the mating rods. This entire caging mechanism clamps around the core and the several rollers and fibre discs are yieldably held in contact with this core as the upper cage is in its closed position as explained above.

Clamped to the end of each lower cage lever 126 is a cage plate 136 having fastened to it a stud 137 fitting into a hole in the end of the lower cage lever. The lower cage plates are in line with each other and fastened to each one are swivel poppets 138 in which sliding poppets are yieldably mounted. The several sliding poppets are held together by triangular links 139 so that the distance from one poppet to the other is held fixed. The triangular links are held in position by means of the shoulder of a bushing which presses into each of the yieldable poppets. Between the respective yieldable poppets in each cage plate are the pivoted rods 95 on which are mounted fibre discs 94. These rods and fibre discs are constantly driven by means of a train of gears 140 which are rotated from the gear 108 of the lower metal feed roller 26. The lower cage levers 126 nearest to this gear 108 has several hubs which accommodate studs for a train of the intermediate gears 140 driving an intermediate gear 141 located and rotating on the stud 137. A link from the stud to one of the aforementioned triangular links 139 holds the first link by means of a shoulder bushing to the triangular link. Mounted in this bushing is one of the cage rods which carry a series of interlocking fibre discs. In addition the rod has pressed to it a gear which meshes with the intermediate gear carried on the stud center from which the lower cage plate subtends. The gear on the rod meshes with an intermediate gear carried on one of the triangular links 139. The intermediate gear meshes with the gear mounted on the second interlocking roller. The gear on the second interlocking roller meshes with an intermediate gear carried on the second triangular link. The intermediate gear meshes and drives the third interlocking roller by means of a gear pressed on to the roller. The two lower cage levers 126 are spaced a certain distance from each other and in addition to being clamped on to the oscillating shaft are tied together by means of a tie rod 142. Mounted on the tie rod are two rods 143 which are slidably mounted in ears carried in a brace in the machine 24. Bearing against the ears of the brace is a compression spring. The other end of the compression spring is yieldably held by means of a collar clamped to the rods. The rods 143 and springs act to yieldably close the caging mechanism around the core at the point where the several leading ends of the webs start to wind on the core.

Wrapping and labelling units

It has already been described that the several sheets which are now wound on the core are taken by the gripper mechanism 90 and deposited in the wrapping unit. In the wrapping unit the roll of sheets has placed around them a combined Cellophane and newsprint wrapper. The Cellophane and newsprint is somewhat wider than the several sheets wound on the cardboard core, the sheets that are now wound on the cardboard core being approximately the same width as the core. After the combined overhanging Cellophane and newsprint wrapper is deposited around this roll, they are followed by a gummed and printed label fed from a label feeder. The gummed label is moistened and placed around the overall wrapped roll and affixed to itself. The overhanging ends of the combined paper and Cellophane wrapper are crimped and tucked into the core. The roll is then deposited on a conveyor from which it is taken and merchandised. The Cellophane and newsprint wrapper are fed into the wrapping equipment from rolls and cut off, after being combined, to a predetermined length.

Referring to Figs. 2, 3 and 14 to 28, the mill roll 144 of newsprint and the mill roll 145 of Cellophane are carried in a vertical mill roll stand 146 at the wrapper end of the machine. The two mill rolls are each placed on a mill roll shaft 147 or spindle and held at their ends by means of chucks 148 which project into the core of the rolls; the chuck on one side being forcibly projected into the core by means of a handwheel mounted on the mill roll spindle 147 and operated on a screw thread. On one end of the mill roll spindle a pulley is carried which acts as a brake pulley. Wrapped around this pulley is a piece of leather with several weights subtended therefrom to offer friction so that the respective rolls do not overrun and unwind faster than the material is pulled into the wrapping machine and consumed. Each mill roll spindle or shaft 147 is adjustable sidewise so that both sheets as they are combined lay one over the other. In other words, these two rolls of wrapper material are mounted in a frame and adjusted similarly to the newsprint and Cellophane webs which feed into the rewinding end of the equipment.

The smaller of the two wrapper rolls is the roll of Cellophane and the web thereof is threaded from its roll of Cellophane through the wrapping equipment as follows: The Cellophane web wraps around an idler roller 149 mounted in the wrapper frame 150. Vertically below this idler roller and spaced a short distance therefrom is a second idler roller 151. The Cellophane web is threaded from the first idler roller around which it has a half wrap down to and around the second idler roller where it also secures approximately one-half wrap. From this point the web is carried between two pinch or forwarding rollers 152. The pinch or forwarding rollers besides feeding the Cellophane web also feed the paper web which meets the Cellophane web at this point. The paper web is threaded under an idler roller 153 which rotates and is carried on several levers 154, the other ends of the levers being securely fastened to a shaft 155 carried in several projecting lugs 156 in each of wrapper frames 150. The web after wrapping around the idler or forwarding roller 153 is carried in a straight line to the pinch or forwarding rollers 152 through which the Cellophane web has been threaded. The Cellophane web as it travels from the second idler roller 151 to the pinch or forwarding roller 152, where it meets the paper web, has a strip of adhesive applied to it transversely thereof from a paste pot 157 carried on a flat bar 158 mounted between the wrapper frame 150. The paste pot has a paste roller 159 in it which reaches into the adhesive carried in the paste pot. As this paste roller 159 is driven the excess amount of adhesive is scraped from the paste roller by means of an adjustable scraper mounted in the paste pot. The paste roller with a predetermined film of adhesive on it moves past the scraper and this film of adhesive is then picked up by segments 160 mounted on a shaft directly above the paste roller 159. These segments 160 remove a portion of the film of adhesive from the paste roller and as the segments rotate from the paste roller, deposit a line of adhesive transversely across the web, as explained above. The Cellophane web, as the several segments carrying the adhesive bear against it, is supported against a roller that backs up the Cellophane web so that the segments can deposit a certain amount of adhesive to the underside of the Cellophane web. The roller in the paste pot, the segment roller that takes the adhesive from the paste roller and the backing roller for the Cellophane are all driven at web speed by means of gearing 161 from the forwarding or pinch rollers 152 that feed both the Cellophane and paper web.

Mounted between the wrapper frames 150 at the end nearest the mill roll stand from which the Cellophane and newsprint wrapper webs are fed into the wrapping unit, is the label feeding mechanism. This label feeding mechanism is capable of handling a stack of several thousand printed and gummed labels. The labels are printed on one side and are gummed on the other side. The label feeding mechanism is so constructed that, through frictional contact with the uppermost label in the stack, this label is removed from the stack and fed into the wrapping equipment in timed relation with the rest of the mechanism to place the gummed and printed label around the completed roll. The label feeder through appropriate control means which will be described further on maintains the top wrapper or label of this stack of labels always at the same height so that the top label is always available for removal from the stack and feeding into the equipment. The label feeding unit is constructed and operates as follows: It will be noted that there is a pad 162 of considerable extent on each wrapper frame to which is fastened on the inside thereof a bracket 163. The brackets in turn slidably support square racks 164, which operate vertically. Incidentally the brackets and racks are in line with each other. Fastened to each one of the racks is a small angle or ledge and resting on the ledges across the entire width of the wrapping unit, is a table 165. Mounted on this table are several side guides 166 which are adjustable to accommodate the stack of labels 167 placed between them on this table. The labels as they are placed between these side guides and on this table are pushed forward against a series of vertically stationary guides that are solidly mounted and held in position on a square bar that is held in each one of the wrapper frames. It will thus be seen that this stack of labels is boxed in on three sides. It is pushed against stationary guides which are solidly mounted in the wrapping unit and between adjustable side guides which are mounted on the table on which the stack of labels is laid. Mounted in hubs on both wrapper frames is a shaft 168 which carries two gears 169, the hubs of which bear against the inside of the respective wrapper frames 150. Gears 169 are of the same size, and are so located that they mesh with gears 164' that are mounted on studs in the rack brackets 163. The gears 164' mesh with the vertically sliding racks 164 on which the table 165 carrying the stack of labels 167 is mounted. The stack of labels placed on this table is positioned, as to height, so that the top label on the stack is in line with a pair of pinch or forwarding rollers 170 which will be described later. The height of the stack of labels is constantly maintained at this point through the following control mechanism. Resting on this top label is a narrow roller or wheel 171 pivotally mounted on a stud, the stud being secured in a lever 172; the other end of the lever being fixedly mounted on a rod or tube 173 which pivots in suitable hubs in the wrapper frames. A long lever 174 is securely mounted to one end of this rod or tube on the outside of one of the wrapper frames. The arm projects in a vertical downward direction. Fastened to a hub on the lower end of this long fixed lever is a slotted link 175. The slotted link rests in the wrapping unit in a horizontal plane. The other end of this link is pivoted to an arm 176 which is rotatably mounted on a sleeve or bushing which is carried on a short stud shaft 177 projecting from the outside of one of the wrapper frames. The other end of this arm carries a shield or guard 178. The shield covers several teeth of a ratchet 179 which is also rotatably mounted on the stud 177. It will be seen that due to the compounding of the several levers between the guide roller 171 which rests on the top label of the stack and the shield 178 which covers several of the ratchet teeth, that the shield will move through a considerably greater arc than the roller 171. The compounding of levers is so arranged that after 5 or 6 labels have been removed from the stack of labels the guiding roller 171 resting on the top label will have dropped the thickness of the several labels. The slight drop is multiplied on the shield which moves sufficiently to allow an operating pawl 180 to drop into the ratchet teeth 179 and through suitable gearing 181 operate to elevate the entire table 164 and labels 167 to such a point where they will again lift the gauge roller 171, the gauge roller being thus raised will automatically through being hooked up with the shield move the shield back to such position as to cover the ratchet teeth and not allow the pawl to drop into the teeth and operate the ratchet until such time as the pile has again lost a predetermined number of labels.

The stud shaft 177 is fixedly mounted on the outside of one of the wrapper frames and clamped in a fixed position on this stud shaft, and the hub bearing against the wrapper frame is a lever 182 having in its free end a stud 183 carrying a stop pawl 184 in mesh with the ratchet 179. Against this lever and rotatably mounted on the stud shaft is a gear 185 and long bushing, the gear being securely fastened to this bushing or sleeve. The rotatable gear and long bushing are held on this stud shaft 177 by means of a collar at the end thereof. Rotatably mounted on this rotatable sleeve or bushing and up against one face of the gear fastened thereto is the shield lever. Next adjacent to the hub of the shield lever is the ratchet 179, the ratchet being securely fastened to the sleeve. Against the face of the other side of this ratchet is the second lever 182 that is rotatably mounted on this sleeve; the other end of this lever carrying the stud 183 that mounts the operating pawl 184 for operating the ratchet. Fixed on the hub of the lever 182 that carries this operating pawl is a cam operated lever 186 and outside and up against the hub of this cam operated lever is a crank arm or handle securely mounted to the rotating sleeve. The gear 185 that is securely fastened to this rotating sleeve is the gear which drives the train of gears 181 that transmit motion to the elevating racks 164 carrying the label feeder table.

From the above description it will be seen that if both pawls 180—184 are disengaged from the ratchet the crank handle can be used for operating the label feeder table either up or down manually due to the handle being fastened to the sleeve and to the gear 185. At the point where the stop pawl 180 is again dropped into the ratchet 179 the table will be held at this fixed position until such time as the shield moves out of the way to allow the cam operated lever to which is fastened the lever carrying the operating pawl to mesh with the ratchet, at which point motion will be transmitted through the train of gearing to the table to elevate it to keep the top of the stack of wrappers at a constant height.

We have up to this time described the mounting and the threading, applying adhesive and feeding of the two wrapper webs from rolls consisting of Cellophane and newsprint to the point where both webs are held and are being fed from the set of pinch or forwarding rollers 152 at which point these two webs are combined. We have also described the construction and operation of the table carrying a stack of printed and gummed labels and the maintaining of the height of the top label. Before continuing further with this description both of the further feeding of the combined Cellophane and newsprint webs and of the labels that are now positioned at this label feeder table, we will go back to the point where we have left the several rewound sheets on the core between the chucks to be carried into the wrapping unit by means of the gripper arms and fingers.

As explained in one of the preceding paragraphs, the rewound roll of several sheets held between the chucks 87 in the carrier reel continues rotating; the tail end of this roll being kept from unwinding by means of spring fingers. At the point where this carrier reel again starts to move through an arc of 120 degrees immediately on the start of the movement of the reel the chucks operate to withdraw from the ends of the rotating roll. At this moment grippers 92 carried in a gripper arm 91 grasp the roll and carry and deposit it into the wrapping cage of the wrapping equipment. The gripper arm, the ends of which mount two pairs of gripper fingers 92 (see Fig. 16), is securely fastened to a shaft 187 that is pivotally mounted in both wrapper frames 150. It will thus be seen that the gripper fingers travel an arc, the center of which is this shaft. At one end of the travel of the gripper arm with the fingers the center of the gripper fingers is such that the gripper fingers encircle and grasp the roll as the cores in the reel release it. The gripper arm with the gripper fingers grasping the roll then carries this roll through an arc pivoting around the shaft on which the gripper arm is mounted to such a point where the gripper fingers release the roll. The point at which the gripper fingers release the roll is such that the center of the gripper fingers and the roll is in line with a pair of chucks 188 which plunge into both ends of the core containing the several rewound sheets. As the arm operates radially from the center on which it is pivoted through the arc it carries the above mentioned roll from the receiving point in the rewind station to the delivery point in the wrapping station. At the receiving point these gripper fingers close around this roll and they remain closed as the arm carries it up to the point where the chucks 188 in a wrapper cage 189 enter the core at its ends. At this point the gripper fingers release the roll. The gripper fingers 90 then remain open on the backward stroke or path of the gripper arm to the point where they again close around the succeeding roll which the chucks are releasing in the carrier reel of the rewinder and the cycle of operation as described above is repeated.

Following is a description of the operation and construction of this gripper arm and its related gripper fingers. As stated the shaft 187 on which this gripper arm 191 is securely fastened is pivotally mounted in the wrapper frames 150. An operating lever 190 is clamped on a projecting end of the shaft 187 at the outside of one of the wrapper frames. The lever 190 at its free end has an elongated hub 191 in which is cut a slot 192. A shoulder bushing 193 passes through this slot in the lever and is securely clamped to the latter by means of its threaded portion and a nut 194. It will be seen that this bushing and nut can be slidably clamped in this slot in varying positions within limits from the center of the oscillating shaft 189 to which this operating lever is clamped. By adjusting and locking this shoulder bushing in a certain relation to the center of the oscillating shaft, different throws on the gripper arm mounted on this shaft will be secured through the action of a cam operated fork 195. This cam operated fork is swivel mounted and held on the operating lever 192 by means of a swivel poppet 196 entering a hole in the bushing 193, which is clamped to the slotted operating lever. The swivel poppet has a hole drilled into it in which is slidably mounted a rod 197, one end of the rod being secured by a collar 198 bearing against one side of the swivel poppet 196. A spring 199 embraces the other projecting end of the rod and is yieldably held against the swivel poppet by means of a collar 200 which is adjustable to bring about various tensions of the spring. The rod beyond the collar 200 projects into and is secured to the slotted fork 195. This slotted fork straddles the cam shaft containing a cam 201 and through the action of this cam bearing against the cam roller 202 carried in the fork, motion is imparted so that the gripper arm is moved through its arc of travel. The object of the spring 199 on this gripper rod is that, if for any reason the gripper arm should encounter any obstruction the cam in its continued operation would merely compress the spring yieldably held between the swivel poppet and the collar that clamps it on this cam fork. The other end of the cam fork rod 197, which is slidably and pivotally mounted in the swivel poppet 196, has fastened to it by means of a bolt an extension rod 203. The other end of the extension rod is held in a plate or arm 204 fastened to the winder frame; it being slidably mounted in this plate or arm. On this rod is mounted a second spring 205 which is yieldably held against this plate or arm by means of an adjustable collar 206. This compression spring 205 tends to operate the gripper arm 91 in one direction. The cam actuated fork 195 operates the gripper arm in its reverse direction, at which time the spring 205 on the rod 203 is compressed sufficiently to allow the force of the spring to operate the arm on its travel from the reel carried in the winder frame, to the point where it deposits the roll in the wrapper cage 189. In other words, it will be seen that through the one spring 199 yieldably held against the cam 201 the arm 91 is cam operated positively in one direction and through means of the compression spring 205 it is operated in the other direction. If for any reason the arm 91 should be prevented from moving, damage is avoided due to the compression spring 205 not having sufficient force to forcibly continue the arm on its predetermined travel. The same also holds true with the spring 199 mounted on the cam fork 195 which acts in a similar capacity. It will now be seen that the cam 201 operates to move through the cam fork 195, the operating lever 190 fastened to the oscillating shaft 187 and operates to move the oscillating shaft 187 through a certain arc and again return it to its original position. This arc is such as to move the gripper arm 91 with the grippers 90 through a certain arc of travel, at one point of which it takes up the rewound roll, at the other point of which it releases it to the chucks 188 in the wrapper mechanism.

The gripper arm 91 is mounted centrally and is securely fastened on this oscillating shaft 187 between the wrapper frames 150. Adjacent to both sides of this gripper arm and loosely mounted on the oscillating shaft are two cams 207 which are in line with each other. The cams 207 are held in a fixed position by means of studs 208 which are securely fastened to each one of the cams and which project from each one of the cams to their respective frames 150. The studs are turned down at their ends to allow them to pass through a slot 209 in the wrapper frames. The larger portion of the stud bearing against the wrapper frame is locked thereto by means of a nut on the threaded end of the turned down portion which projects through the slot 209 of the wrapper frame. By loosening this nut and adjusting the stud in the slot in the wrapper frames, adjustment can be secured for the cams 207 loosely mounted on the oscillating shaft. It will be noted that the cams 207 have an enclosed upper and a lower cam track 210. In addition to having this enclosed upper and lower cam track, each of the cams have an outer cam track or rise 211. The functions of the cams and their respective cam tracks are to open and close the gripper fingers 90 at such point to grasp the rewound roll from the carrier reels in the rewinder and release it to the chucks in the wrapping unit.

The gripper arm 91 at its free end carries the gripper finger units 90. Each one of the units is constructed as follows: A slotted steel slide block 212 is fastened to each side of the gripper arm 91. Pivotally mounted on the arm 91 are the two gripper fingers 91. Fastened to these gripper fingers or jaws are links 213 pivotally mounted on studs 214 in the jaws. The other ends of the links are pivotally mounted on an operating slide 212 that slides radially to and from the center of the operating shaft 187 to which the gripper arm is securely fastened. It will be seen when this operating slide is moved in a radial direction away from the center of this operating shaft that the two pivotally mounted links 213 of the jaws will assume a closed position. When the slide is moved in a radial direction toward the operating shaft 187 by means of the links the jaws or grippers will open. This operating slide is held to the gripper arm by means of head studs 215 projecting through slots 216 in the slide, which are securely fastened in hubs 217 in the arm 91 in such a manner as to allow the slide 212 to move freely in a radial direction. The opposite end of the slide 212 is provided with a long slot 218. The slot 218 receives the operating shaft 187 and the slide is loosely held between the hub of the operating cam 207, loosely mounted on the operating shaft, and against movement by means of the stud 208 in the slot 209 of the wrapper frame 150 and the projecting hub of the gripper arm. The slide has two studs 219—220 securely fastened to it; one at each end of the slot 218. The studs 219—220 have pull springs 221—222, respectively, fastened to them. The lower pull spring 222 is attached at its lower end in an arm 223 projecting downwardly from the gripper arm 91 beyond the operating shaft 187. The spring 222 is held on the ear by means of a stud 224. It will now be seen that through the action of the pull spring 222 the slide will be pulled downwardly and the gripper fingers will open. The upper spring 221 is fastened to the stud 219 at one end and at the other end to a link 225 which is pivotally mounted on one of the studs 215 holding the slide against the gripper arm. At the free end of the link 225 is mounted a cam roller 226. This cam roller rides on the outer cam track 211 of the stationary cam 207. The pull springs 221—222, the cam roller 226 which rides the outer track 211 of the stationary cam 207, and the upper and lower closed cam tracks 210 operate to open and close the gripper fingers 91 at the correct respective positions in the travel of the arm 91 from the receiving point to the delivery point of the rewound roll. The operation of the springs 221—222, cam roller 226 and cams 210 and 211 is as follows: It will be seen that in order to open and close the gripper fingers 90 it is necessary to operate the slide 212 to which these gripper fingers are fastened by means of the pivotally mounted links, the movement being in a radial direction toward and away from the operating shaft 187 to which the gripper arm is fastened. The slide 212 is operated by the several pull springs and the operating cam and the several cam tracks by means of a square cam block 227 which is fastened to the slide 212. In order to more clearly understand the manner in which this slide controls the opening and closing of the gripper fingers it is well to follow the arm and the gripper fingers through one cycle of operation. Assume that the gripper arm has moved to a position where the gripper fingers 90 have just closed around the roll which the chucks in the rewinder reel have released. In order that the gripper fingers close around the roll it was necessary for the slide which controls them to be operated radially away from the operating shaft. At the point where the grippers close around the roll, the gripper arm is in such a position that the link, due to the cam roller riding the outer cam track of the stationary cam, has so stretched the spring 224 that as the square block cam toe 227 of the slide moves along the lower enclosed track 210 of the cam 207 it reaches a point where the upper portion of this cam track ends. The square block 227 of the slide 212 not being able to hold the slide against the added tension of the pull spring 221 as it rides up on the outer cam track 111, the pull spring 221 will operate to move the slide radially upward closing the gripper fingers 90 around the roll. The gripper fingers however can only close just so far due to the slide being stopped from going any further by the square cam block 227 hitting the outer cam track 210. The gripper arm 91 will now travel in the opposite radial direction and this square cam block 227 will slide between the outer cam track 210 which has stopped it and the slide from moving outwardly any further until the arm has reached such a position as to allow the link 225 with the cam roller 226 to roll off the outer cam track 211 and take the pull off the spring 221 which has yieldably moved this slide outwardly. At this point the square cam reaches the end of the inner track and the arm has reached its furthest radial travel around the center of the operating shaft 207. At the point where the square cam reaches the end of the inside cam track the slide 212 will be urged downwardly due to the tension contained in the lower pull spring 222 which is fastened to the slide. This lower pull spring 222 will yieldably urge the slide radially toward the center of the operating shaft until the square cam 227 engages the outer lower track 210 which acts as a stop for the slide. At the point where the square cam drops from the outer track to the lower inner track, the gripper fingers are open. The square cam will now follow the lower cam track as the arm moves in a direction to again position itself for grasping the next roll from the carrier reel in the rewinder. As the arm assumes the position where it is in line with the roll in the carrier reel in the rewinder, the square cam will again have reached the end of the upper track and due to the upper pull spring riding up on the bump of the outer cam 211 and receiving an added tension on it, the slide and the square cam will be yieldably urged upwardly against the outer cam track 210. At this point the grippers again close around the roll and the gripper arm moves the roll to the position where it is released in the wrapper cage 189. The gripper fingers 90, while the gripper arm 91 is carrying this roll to the wrapper cage 189, remain closed due to the square cam being carried in the upper track of the cam until such point is reached that the lower portion of the upper cam track ends and the slide is again yieldably forced downward by the action or pull of the lower spring 222 and the gripper fingers 90 open releasing the roll to the wrapper cage, 189 and the chucks 188.

As stated in the preceding paragraphs the roll is taken from the reel in the rewinder by means of the gripper arm and fingers and deposited in the wrapping unit. At the point where this roll is deposited the several wrappers and bands are placed around it and the overhanging ends of the wrappers are crimped and tucked into the core, after which the roll is ejected onto a delivery or conveyor and the following roll taken by the arm and grippers is placed in the above station and the operations as explained above repeated.

At the point where the gripper fingers release the roll in the wrapper unit it is encircled by caging mechanism 189 somewhat similar to that employed in the rewinder unit for encircling a core and starting the leading end of the feeding web thereon. In addition, simultaneously with the roll being deposited in this cage, chucks 188 in coalignment with each other operate to enter and support and rotate the roll while in this wrapping cage for placing the wrappers and bands thereon.

The caging mechanism 189 which encircles the roll in the wrapping unit is constructed and operates as follows and in timed relation with the gripper arm 91 and the chuck mechanism. The caging mechanism in the wrapping unit comprises a stationary lower cage 228 composed of two rods 229 on which are mounted interlocking rollers 230 and a cam operated upper cage consisting of four sets of rods 231 on which are mounted interlocking rollers 232. While the arm and the gripper fingers are carrying a roll to the point where they will release it to the mechanism in the wrapper unit, the upper cage is in an open position to allow the roll in the gripper arm 91 to pass by under the upper cage. As the roll approaches the point where the gripper fingers release it, the cam operated upper cage follows immediately behind it so that at the moment the roll contacts the stationary lower cage, at which point the gripper fingers release the roll, this cam operated upper cage has encircled the roll and is interlocked with the stationary lower cage 228. It is necessary to have this upper cage close around the roll in conjunction with the stationary lower cage 228 in which the roll nests, at the point where the gripper fingers release it, because if the roll at the point where the gripper fingers release it were not encircled by the caging mechanism the tail end of the roll would unwind. Simultaneously with the gripper fingers releasing this roll and the caging mechanism encircling the roll, the chucks 188 that are in co-alignment with each other are yieldably urged toward each other to enter the core at both ends of the roll.

The stationary lower cage 228 is carried on a square bar 233 that is securely fastened into position between the two wrapper frames 150. The lower cage fastened to this square bar is made up in sections, a center section of such width as to allow the gripper fingers mounted in the gripper arm to pass by and allow the roll to contact the interlocking rollers of this lower cage section. Two additional stationary cage sections are also mounted on this square bar and are so positioned as to allow the gripper fingers to pass by them without interference. These two sections are located one on either side of the center section which is mounted on the square bar in between the gripper fingers fastened to the gripper arm allowing the gripper fingers sufficient clearance so that the cage does not interfere with their action. These several stationary lower cage sections are composed of plates and hubs that are securely fastened to the square bar. In these plates are journaled the rods on which are mounted the interlocking rollers 229, these rollers being pivotally and yieldably held against the roll. The cam operated upper cage is mounted on a square bar 234, the ends of the square bar being turned down and pivotally mounted in journals in the wrapper frames 150. Fastened to the square bar is a center section composed of the interlocking rollers 232 fitted between the two gripper fingers 90 and outwardly thereof is mounted on this square bar an additional set of interlocking rollers 232. These upper cage plates that are subtended from the cam operated square bar 234 carry further rods with interlocking rollers 232 on them; the rods and rollers being so constructed that they are yieldably and rotatably held against the roll. At the point where the gripper fingers release the roll, the upper and lower cages interlock so as to form a complete section of interlocking discs around the periphery of the roll. Projecting outwardly from one of the wrapper frames and clamped to the turned down portion of the cam operated square bar on which the upper cage is mounted is an operating lever 235. The outward portion of this operating lever has an elongated boss 236 in which is located a slot 237. A shoulder stud 238 passes through the slot 237 and is locked securely to this operating lever by means of a nut. The position the shoulder stud 238 takes in the slot 237 and in relation to the center of the upper cage operating bar 234 determines the throw of the upper cages. Pivotally mounted on this shoulder stud 238 is a fork 239 which straddles a cam shaft 240. The fork carries a cam roller 241 which is yieldably held in contact with the cam by means of a spring 242 secured to a small link or cap 243 fastened onto the ends of the projecting prongs of the cam fork 239. The operation of the cam is such that the cam tends to open the cage and the spring tends to close the cage around the core as the latter is positioned by the gripper fingers and gripper arm.

On the lower cage 228 are a series of guides 244 pivotally mounted on a rod 245 between the several cage plates. The guides 244 act as a table along which the wrapper feeds between the roll and the first interlocking roller 230, and then as the leading end fits around the roll being held against it and is propelled by the several interlocking rollers of the upper and lower cage to a point where the leading end passes between the roll and the last interlocking roller. The leading end from this point slides between the roll and the concave surface of the several stationary guides 244 which tend to hold the leading end of the wrapper tightly against the roll to such a point where it fits between the wrapper that still rests on the guides and the roll.

The above is a description of the construction and operation of both the lower stationary cage 228 and the upper cam operated cage 189 which encircle the roll at the point where it receives the wrapper. The upper adjustable cage is operated in timed relation to the gripper fingers 90 and gripper arm 91 and the wrapper and label feeding mechanism so that the upper cage encircles the roll at the time the gripper fingers deposit it into the wrapping unit and remains around the roll until such time as the wrapper and band have been placed about the roll and after the operation of crimping and tucking the overhanging ends of the wrapper into the core, the cage is opened to release the roll to the delivery and again closes around the following roll to encircle that, when the above wrapping operation is repeated. Incidentally, both the interlocking rollers in the cam operated upper cage and stationary lower cage are frictionally driven through yieldably contacting the roll. The roll after being positioned in the cage and after the chucks have entered it is rotated due to the rotating chucks frictionally contacting the ends of the roll.

Following is the description of the operation of grasping the roll held in the wrapper cages by the rotating chucks 188. These chucks rotate the roll and the interlocking rollers of both upper and lower cages by being yieldably held against the roll for a sufficient period of time to allow the wrapper and label to be placed around the roll, at which point the chucks withdraw from the roll; and at the point where the chucks release the latter it is not rotating and the tucking or crimping fingers 246 operate on the overhanging ends of the wrapper to crimp it toward the axis of the roll. The hollow nose 247 of the chucks again approach the roll, gather up the crimped ends and, as the tucking fingers open, plunge the crimped overhanging ends of the wrapper into the hole in the core of the roll.

Passing through bosses 248 in each one of the wrapper frames and projecting for a considerable distance beyond, the latter frames is a cam shaft 46 carried in outboard brackets. The projecting ends of the cam operating shaft 46 are rotatably mounted in outboard bearings or brackets 250.

The shaft 46 is driven by means of an oblique angle shaft 251 from the cam shaft of the winding machine by means of sets of mitre gears 252 mounted on both ends of this oblique angle shaft.

The cam operating shaft 46 is driven in timed relation with the cam shaft in the winder. Both the winder cam shaft and the main cam shaft in the wrapping unit make one revolution for each cycle of the mechanism or for every roll produced on it. Mounted between the outboard bearings and the wrapper frames are the several cams that tend to operate certain units of the equipment in unison. Fastened between one wrapper frame and the outboard bearing on one side is the cam 207 that operates the gripper arm that removes the roll from the rewinder and places it in the wrapping unit. Fastened on the cam shaft on the outside of each wrapper frame is an operating cam 253 which operates and controls the rotating chucks 247. This same cam through suitable mechanism also operates the tucking and crimping fingers that crimp the overhanging ends of the wrapper. Fixed on the outboard bearing 250 and the wrapper frames 150 are two gears 254 which rest against the face of the inner hub of the outboard bearings. Through a compound gear drive to be explained in a later paragraph it will be seen that the two gears operate to rotate a spindle or shaft 253 on which the chuck 246 is carried.

As mentioned in one of the preceding paragraphs, the wrapper chucks 188 which hold the roll carried over by the grippers 90 and gripper arm 91 as it rests in the wrapper cage 189 are coaxially in line with each other. Also projecting radially from the center of the wrapper chuck spindle are mounted the tucking or crimping fingers 246 which operate on the overhanging ends of the wrapper after it is placed around the roll located in the wrapper cage. The tucking or crimping fingers are mounted in an adjustable head 256. The adjustable head 256 is slidably held in the wrapper frame by means of two studs 257 which are securely fastened in the head and are slidably mounted in holes 258 in the wrapper frames 150. The head 256 is so mounted that the center portion of the head provides the bearing for the chuck spindle 255. The head is slidably mounted and adjustable so as to enable the crimping fingers 246 pivotally mounted in the head, to be positioned to operate on different length rolls. The other end of the chuck spindle 255 is securely mounted and journaled in a hub 259 of a further outboard bracket or bearing 260. The bracket 260 is constructed to provide a mounting for drive mechanism for rotating the chuck spindle and the chuck for plunging it into and withdrawing it from the roll, and through mechanism mounted on this chuck as it plunges and withdraws from the roll to operate the tucking or crimping fingers in timed relation with it.

Mounted on a hub 259 in the bracket 260 is a compound gear 261 held to this hub by means of a shoulder stud 262 securely held in the hub of the bracket. The smaller of the two compound gears meshes and is driven from the drive gear 254 mounted on the cam shaft 46, the drive gear resting against the inner face of this outboard bracket supporting the cam shaft. The larger of the two compound gears mounted on the stud meshes with a drive pinion 263 held in a slot in the hub of the outboard bracket. The drive pinion is held from moving laterally between two shoulders 264 of this outboard bearing 259. The pinion 263 is securely fastened to a sleeve 268 projecting from both sides of the pinion into the bore of this outboard bracket. The sleeve is rotatably mounted in this bore. It will be seen that through this construction the main drive gear 254 located on the cam shaft 46 drives the small compound gear 261, meshing with the small pinion thereof, the large compound gear meshing with the chuck pinion 263 carried on the sleeve forming a bearing for the chuck spindle, the pinion being securely fastened to this sleeve. Through this construction the gear drive on the cam shaft rotates both the chuck pinion and sleeve through the compound gear drive. Slidably mounted in this sleeve is the chuck spindle 255 and by means of a key 269 fastened in the chuck spindle and slidably mounted in a keyway contained in the sleeve, the chuck spindle gear and sleeve impart a rotating motion to the chuck spindle but due to the straight keyway and key doing the driving, the chuck spindle is slidably held in this sleeve and driven by it. It will be seen that the chuck spindle 255 derives its rotary movement through the gear drive explained above.

The lateral motion of this chuck spindle toward and away from the core of the end of the roll is obtained by means of a flanged collar 270 which is slidably mounted on this chuck spindle and which has a keyway cut into it to clear the key 269 in the chuck spindle. The collar has a set screw which forces the collar securely to the chuck spindle 255 and which bears on the key. The opposite sides of this flanged collar are several cam rollers 271, the diameter of the cam rollers being approximately the distance between the flanges of the collar. The two cam rollers are mounted on studs 272 positioned in an arm or clevis lever 273 which is pivotally mounted in the bracket or outboard bearing 260, carrying the outer end of the chuck spindle, by means of a stud 274 fastened into a hub on the bracket. Projecting at right angles to the clevis arm 273 and forming a bell crank lever is a shoulder stud 275 on which is rotatably carried a barrel cam roller 276. The barrel cam roller rests on the cam 253 mounted on the cam shaft 46 and operates the chuck shaft or spindle. The flanged collar is withdrawn from the core in the end of the roll by means of a spring 277 mounted on a spring rod 278, one end of which has an eye fastened to the stud 277 on which one of the cam rollers 271 is mounted. The other end of the spring rod is slidably held in an arm 279 mounted on a projecting stud 280 fastened in the outboard chuck spindle bracket 260. The other end of the compression spring bears against a clamp collar 281 by means of which the compression spring can be adjusted by sliding this clamp collar and clamping it in various positions on the spring rod 278. Through the action of the spring bearing against the lever or arm at its one end, and the clamp collar securely fastened to the spring rod at its other end, and the spring rod being held on the stud of the compound clevis and bell crank lever 273, the chuck 188 is yieldably urged into the core by means of this spring arrangement.

This chuck 188 is so constructed that the nose of it is hollow as at 247, the outside shell portion being of such size to freely enter the core of the rewound roll located in the wrapper case, the chuck having a larger back portion 282 which acts as a stop or shoulder preventing the nose from entering just so far into the core of the roll.

Rotatably mounted on this chuck spindle almost immediately in back of the chuck is a cylindrical rack 283, the teeth of this cylindrical rack meshing with teeth 284 cut into the portion of the tucking or crimping fingers pivotally mounted in their adjustable head 256. Against both ends of this rotatable rack several compression springs 285-285' are mounted. One of the compression springs bears at one end against the back shoulder 282 of the chuck and the other end of this compression spring bears against the shoulder of a recess cut into this cylindrical rack. The compression spring 285 is yieldably held against the rack by a sleeve 286 securely fastened to the chuck spindle. It will be seen that through this construction the chuck, through being spring urged by the compression spring 277 mounted on the spring rod 278 and the chuck spindle 255 operate to project themselves into the end of the core of the roll. The compression spring 285 straddles the chuck spindle and bears at one end against the sleeve securely fastened to this chuck spindle and at its other end against the back hub of the cylindrical rack, so that the chuck is projected into the core of the roll through the action of this compression spring 285 on the cylinder rack, which is projected forwardly, and due to the crimping or tucking fingers 246 meshing their segment portions 284 with the rack 283 the fingers are urged outwardly to open position. In other words, they move away from the axis of the chuck spindle. The fingers after they have opened a certain distance are stopped by means of stops 287 carried in the chuck head 256 in which they are mounted. The chuck still continues along its path of travel entering the core of the roll held in the wrapping cages. The additional action of the cylindrical rack 283 tends to open the tucking or crimping fingers still further. As the rotating chucks withdraw from the ends of the roll after the wrapper has been placed around it, (the wrapper overhanging the ends of the roll,) the roll stops rotating and the chuck in its backward travel then engages the short spring 285' mounted on the chuck spindle between the back of the chuck head and the cylindrical rack. The chuck head coacts with the spring 285' bearing against the cylindrical rack, and on the outward stroke of the chuck and chuck spindle the rack operates and closes the tucking or crimping fingers 246. The tucking or crimping fingers move toward the axis of the chuck spindle and operate on the overhanking ends of the wrapper to crimp and hold it in the crimped position until the chuck nose 247 has traveled toward the roll to the point where the crimped portions of the wrapper are gathered up in the hollow ends of the chuck. At this point the spring 285' between the chuck and the cylindrical rack has lost its compression entirely and the spring 285 on the other side of the cylindrical rack has been compressed sufficiently for the cylindrical rack to operate to open up the crimping and tucking fingers. The chuck with the gathered portions of the crimped wrapper continues on its travel and plunges these crimped ends into the core, at which time they again withdraw and assume a position where the chucks 188 and the crimping and tucking fingers 246 are both in a neutral position where they will not interfere with the objection of the roll from the wrapper cage and the placing of the following roll in the wrapper cage. The various positions taken by the chuck and associated parts are illustratively exemplified in Figs. 19 to 26.

After the wrapper has been placed around the rewound roll in the wrapping cage and the overhanging ends of the wrapper tucked into the core and the chucks have withdrawn from the ends of the roll, the upper cage is cam actuated and opened. As soon as the upper cage has opened sufficiently, the wrapped roll is released from the wrapping cage and drops onto a delivery or conveyor 288 along which it is carried beneath a presser board 289 having a yieldable surface so that the wrapper after passing under this board is firmly affixed to itself. The roll continues on somewhat further along the delivery beyond the end of the presser board and is either deposited in a receptacle at the end of the delivery or taken from this point and placed into boxes for shipment. Some distance below and to one side of the wrapper cage 189 a delivery shaft 290 is journaled in the wrapper frames 150. The shaft 290 carries a gear 291 in mesh with a gear 292 mounted on the cam shaft 46. Fastened to the delivery shaft are a series of pulleys 293 which carry the ends of suitable delivery or conveyor belts 294. The other ends of the delivery belts 294 are carried on a series of delivery pulleys 295 arranged on a shaft 296 which is journaled in adjustable boxes 297 slidably mounted in slotted brackets 298. The slotted brackets are mounted on several rods 298', the rods and the delivery belts being diagonally placed in the wrapping equipment. The rods 298 project upwardly to such a point where their ends are carried in the hub of a bracket that is mounted on the delivery shaft, the bracket being bushed to allow the delivery shaft 290 to rotate freely in it. The bracket is pivoted on this delivery shaft and is held in a certain side alignment by means of collars placed on each side of it. The upper portion of the delivery belts 294 around the several delivery pulleys is supported by means of guide strips 299 on which these belts rest, a guide strip being placed beneath each belt. The guide strips are held in their respective positions by means of several cross bars 300 to which these flat guide bars are fastened. The flat cross bars at their ends rest on several brackets 301 to which they are securely fastened. The other ends of these brackets are mounted on the diagonal rods 298 which run from the delivery shaft 290.

The diagonal portion of this conveyor or delivery on which the ejected roll from the wrapper cage first drops as will be noted is inclined. This inclined portion has a presser board fastened to it. This presser board is adjustable up and down in relation to the distance it has from the several delivery belts so that the height can be adjusted between the belts and the underside of the presser board to accommodate whatever diameter roll the machine is set for and is at that moment being ejected from the wrapping cage. As explained in a previous paragraph, the wrapped roll is deposited on this conveyor or delivery and finds its way between the portion of the conveyor that is on an incline and the presser board. The presser board has a soft yieldable surface and tends to hold the roll gently as the delivery belts propel it underneath the board. The purpose of the presser board is to securely hold down the tail end of the pasted wrapper until the adhesive has securely set. This presser board consists of a flat piece of material to the underside of which is fastened a piece of yieldable material such as soft sponge rubber. By means of several studs and brackets this board is elevated or depressed to suit the several diameter rolls that the equipment can accommodate. The presser board is of such width that it will cover the longest roll that the wrapping equipment can handle. The length of the presser board is approximately the length of the portion of the conveyor that is on an incline.

What we claim is:

1. In a machine of the character described, the combination of means forming a rewind station and a wrapping station, in which continuously feeding webs of material to be rewound are severed into sheets of predetermined length and rewound on cores, means to transfer the rewound roll from the rewind to the wrapping station, caging means to receive the roll from the transfer means, means to feed wrapping material in a continuous web, sever the same into sheets and secure the wrapper about the roll.

2. In a machine of the character described, the combination of means forming a rewind station, comprising spaced sets of feed rollers which continuously feed webs of the material to be rewound, severing means interposed between the sets of feed rollers to sever the webs into sheets of predetermined lengths, and means to start and rewind the sheets on cores, a wrapping station to receive and wrap the rewind rolls, means to transfer the rewound roll from the rewind to the wrapping station, and caging means to receive the roll from the transfer means, said feeding means comprising means to feed wrapping material in a continuous web, sever the same in sheets and secure the wrapper about the roll.

3. In a machine of the character described, the combination of means forming a rewind station and a wrapping station, in which continuously feeding webs of material to be rewound are severed into sheets of predetermined lengths, and rewound on cores, means to transfer the rewound roll from the rewind to the wrapping stations, caging means to receive the roll in the wrapping station, means to feed wrapping material in a continuous web, sever the same into sheets and secure the same about the roll, and means to feed and apply a label about said wrapper roll.

4. In a machine of the character described, the combination of means forming a rewind station and a wrapping station, in which continuously feeding webs of the material to be rewound are severed into sheets of predetermined lengths and rewound on cores, caging mechanism to start the leading ends of the webs on a rotating core and cause the sheets of material to rewind completely about said core, and means to pick up the rewound roll in the rewind station and transfer it to the wrapping station.

5. A machine, as claimed in claim 4, in which said transfer means comprises an arm pivotally mounted at one end, clamping fingers operatively mounted on the free end of the arm, and means timed to move the arm into position alined with the center of the rewound core and to close said fingers about said rewound core and roll, and thereafter swing the arm to a position to deliver the rewound roll into the wrapping station and finally to open said fingers to release the roll.

6. A machine, as claimed in claim 4, in which said last named means comprises an arm pivotally mounted at one end, clamping fingers pivotally carried on the other end of said arm, a system of levers and slide rods connected to said fingers to cause them to swing apart and then together to grip a rewind roll delivered by said rewind station, and means to first swing the arm towards the rewind station where the system of levers and slide rods operates to open the fingers to move under and adjacent said rewind roll and thereafter to close about the latter and second to swing the arm and the roll away from the rewind station and into the wrapping station, where said system opens the fingers to release the roll.

7. In a machine of the character described, the combination of means forming a rewind station and a wrapping station, in which lengths of webs of materials are rewound on cores, and means timed to operate upon completion of a rewound roll to first grip the same and then transfer it to the wrapping station and then release it.

8. In a machine of the character described, the combination of means forming a rewind station in which continuously traveling webs of material are severed into sheets and rewound on cores, a wrapping station to wrap the rewound roll, and a device to transfer the rewound roll from the rewind station to the wrapping station, comprising a rock shaft, a cam controlled connection to said shaft to intermittently rotate it back and forth through an arc between the two stations, an arm construction carried by and movable with said shaft, a slide bar disposed longitudinally of said arm, gripping fingers pivotally mounted at the free end of said arm, links connecting the fingers to said slide bar, a double track cam plate to engage the slide bar and hold the latter down and the fingers open through the entire movement of the arm from the wrapping station to the rewind station, means tensioned by movement over a raising cam surface of the cam plate to lift said slide at the end of the cam tract towards the rewind machine and close the fingers about the rewound roll, said fingers remaining closed and carrying said roll with the arm towards the wrapping station, means tensioned by the later movement of the arm to snap the slide bar from its upper position held by the upper track to its lower position in the lower track to open the fingers and release the rewound roll to the wrapping station.

9. A machine, as claimed in claim 8, including a wrapper feed to deliver a sheet of wrapping material to the rewound roll, chucks to enter the core of said roll and rotate the same, caging means to embrace the roll when released by said fingers and to start the wrapper sheet on and complete the winding thereof about the roll, crimping means connected to said chucks and movable into closed position as the chucks withdraw from the core to crimp the projecting ends of the wrapper over the ends of the core, and means to project the chucks to tuck the crimped ends of the wrapper into the ends of the core.

10. A machine, as claimed in claim 8, including means to feed a wrapper from a web of wrapping material, severing the same to form a sheet, and guides to bring the leading end of the wrapper sheet to the rewound roll, rotary chucks movable axially to project into the ends of the core, a cage mechanism to start the leading end of the wrapper about the roll, and allow the wrapper to completely wind about the roll, said wrapper being wider than the roll to allow the ends to project, crimping arms disposed radially of the chucks and means operated by retracting the chucks axially to move the fingers inwardly to engage and crimp the projecting ends of the wrapper, and means to again project the chucks to tuck the crimped ends of the wrapper into the cores and to open the crimping fingers.

11. A machine, as claimed in claim 8, including means to feed a wrapper from a web of wrapping material, severing the same to form a sheet, and guides to bring the leading end of the wrapper sheet to the rewound roll, rotary chucks movable axially to project into the ends of the core, a cage mechanism to start the leading end of the wrapper about the roll, and allow the wrapper to completely wind about the roll, said wrapper being wider than the roll to allow the ends to project, crimping arms disposed radially of the chucks and means operated by retracting the chucks axially to move the fingers inwardly to engage and crimp the projecting ends of the wrapper, and means to again project the chucks to tuck the crimped ends of the wrapper into the cores and to open the crimping fingers, and means to feed and apply a gummed label to the wrapped package to bind the latter about its mid-portion.

12. In a machine of the character described, the combination of means forming a rewind station and a wrapping station, in which lengths of webs of materials are rewound on cores, means to transfer the rewound roll from the rewind to the wrapper stations, means to wrap a wrapper about said rewound roll, comprising a pair of chucks to receive the core from the transfer means, each chuck being provided with a circular rack rearwardly of the end inserted in the core, pivoted fingers disposed radially of each core and provided with teeth at its pivoted end in mesh with the circular rack, a cam operated lever to reciprocate the chuck axially thereof to first insert the chuck in the end of the core, then to retract the chuck to move the fingers into position to crimp the projecting ends of the wrapper wound on the rewound roll and finally to retract the fingers and again inserting the chuck into the core to tuck in the crimped end of the wrapper.

13. A machine, as claimed in claim 12, including a cam shaft, means to rotate the chucks from the shaft to wind up the wrapper on the roll, and a cam mounted on the cam shaft and provided with two spaced high points to operate the cam lever and cause the latter to project the chucks to pick up the roll, retract the chuck to operate the fingers to closed position and to again project the chucks to tuck in the wrapper.

14. A machine, as claimed in claim 12, including caging means to start the wrapper on the roll, comprising a fixed holder partly encircling the roll at one side and provided with discs to bear against the roll, a pivoted holder encircling the remainder of the roll and provided with discs to engage the roll and start the leading end of the wrapper about the roll, a cam with one high point and a forked connection for the pivoted holder are provided with a cam followed to ride on said cam to swing the carrier and discs into and out of contact with said roll.

15. In a machine of the character described, the combination of means forming a rewind station for webs of material which is continuously fed from mill rolls, severed into predetermined lengths and wound on cores, comprising a reel having a plurality of chucks to receive the cores and carry them through a part of a circle, means to feed cores to the chucks, means for closing the chucks to engage and carry a core from said feed means, a rotary shaft supporting the reel, a driven gear loose on said shaft, gears carried by each chuck in mesh with the driven gear to rotate the chucks, and a Geneva lock to intermittently rotate said reel to move the chucks from the core pick-up position to a position to receive the leading ends of the webs and then to a position to discharge the rewound core.

16. A machine, as claimed in claim 15, including fixed cam tracks adjacent opposite ends of the reel, and means carried by the chucks and engaging the cam to open the chucks as they reach the core feeding means and to close the chucks on the core and carry the same to the rewind position and then retract the chucks to release the rewound roll.

17. A machine, as claimed in claim 15, including a caging mechanism, comprising pivotally mounted jaws to move into and out of position about the core reaching the rewind position, discs carried by said jaws to contact the core, means for rotating the discs of one jaw to start the leading ends of the webs on the core.

18. A machine, as claimed in claim 15, including a caging mechanism, comprising pivotally mounted jaws to move into and out of position about the core reaching the rewind position, discs carried by said jaws to contact the core, means for rotating the discs of one jaw, to start the leading ends of the webs on the core, a cam and cam follower connected to one of said jaws to move it and the discs into and out of engagement with the core, and means for moving the second jaw from the first to move it and the discs into and out of engagement with said core.

RUDOLPH H. SCHULTZ.
ADAM J. SIEBERT.